(12) United States Patent
Linder

(10) Patent No.: US 10,339,808 B2
(45) Date of Patent: Jul. 2, 2019

(54) PREDICTING PARKING VACANCIES BASED ON ACTIVITY CODES

(71) Applicant: HERE Global B.V., Eindhoven (NL)

(72) Inventor: Eric Linder, Downers Grove, IL (US)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 15/477,354

(22) Filed: Apr. 3, 2017

(65) Prior Publication Data

US 2018/0286238 A1  Oct. 4, 2018

(51) Int. Cl.
| | |
|---|---|
| *G08G 1/00* | (2006.01) |
| *G08G 1/14* | (2006.01) |
| *G06Q 10/04* | (2012.01) |
| *G06Q 50/30* | (2012.01) |

(52) U.S. Cl.
CPC ............ *G08G 1/141* (2013.01); *G06Q 10/04* (2013.01); *G06Q 50/30* (2013.01)

(58) Field of Classification Search
CPC ............... G08B 1/14; B60Q 1/48; G08G 1/00
USPC ........................... 340/932, 932.2, 988, 995.1
See application file for complete search history.

(56) References Cited

U.S. PATENT DOCUMENTS

| | | | | |
|---|---|---|---|---|
| 7,613,687 | B2 | 11/2009 | Nye | |
| 8,217,806 | B2 * | 7/2012 | Kim | ........................ G08G 1/143 340/436 |
| 8,700,314 | B2 * | 4/2014 | Vavrus | .................... G01C 21/20 701/410 |
| 8,779,940 | B2 | 7/2014 | Amir | |
| 8,847,791 | B1 * | 9/2014 | Urbach | ................ G08G 1/0112 340/932.2 |
| 8,963,740 | B2 * | 2/2015 | Koukoumidis | ........ G08G 1/141 340/426.2 |
| 9,378,256 | B2 | 6/2016 | Alkadi et al. | |
| 9,786,175 | B1 * | 10/2017 | Ullrich | .................... G08G 1/142 |
| 2005/0128212 | A1 | 6/2005 | Edecker et al. | |
| 2013/0113936 | A1 * | 5/2013 | Cohen | .................... G07B 15/02 348/148 |
| 2014/0222723 | A1 | 8/2014 | Narasimha et al. | |
| 2016/0358473 | A1 * | 12/2016 | Scofield | ................. G08G 1/141 |

OTHER PUBLICATIONS

Szarata, Andrzej, "Estimation of Daily Traffic on Local Roads in Indiana State—A Mix of Heuristic Search Tool, GIS, and Visum Simulation", < https://www.researchgate.net/profile/Andrzej_Szarata/publication/269047821_Estimation_of_Daily_Traffic_on_Local_Roads_in_Indiana_State_A_Mix_of_Heuristic_Search_Tool_GIS_and_Visum_Simulation/links/5644543c08aef646e6ca7acf.pdf >, Jun. 2013.

* cited by examiner

*Primary Examiner* — Phung Nguyen
(74) *Attorney, Agent, or Firm* — Lempia Summerfield Katz LLC

(57) ABSTRACT

System and methods are provided for predicting occupancy of a parking area. A request is received for data relating to occupancy of the parking area. One or more entities within a first predefined distance of the first parking area are identified. Activity classification codes for each of the one or more entities are identified. A predicted occupancy for the parking area is calculated as a function of the activity classification codes. The predicted occupancy for the parking area is transmitted.

19 Claims, 13 Drawing Sheets

PREDICTING PARKING VACANCIES BASED ON ACTIVITY CODES

FIELD

The following disclosure relates to navigation devices or services.

BACKGROUND

Attempting to find a parking spot may be a normal activity for drivers. A navigation system may calculate a route from a starting point to a destination. However, if there is no parking available at the destination, the efficient routing may be wasted. A driver may spend additional time and energy cruising or circling the destination to find an open parking spot. Calculating an arrival time at a destination may not take into account the additional time that is spent trying find an open spot. Further, in certain areas, an open parking post may be located just a short distance away, that, if the navigation system was aware of, could save time by setting the destination for the open spots and not the requested destination that lacks open parking spots. The availability of parking may thus be a key factor in providing improved routing services.

Parking systems have been implemented that make use of sensors or mobile applications to identify open spots. However, the systems may be difficult and expensive to implement (e.g. digging up a parking spot to install a sensor) and as such may only cover newly constructed parking structures or specific high traffic areas. Other parking systems such as counting the number of vehicles in and out of a lot may be used, but also have limited usage and require specialized devices. Such systems may only cover a fraction of the total parking spots in a region.

SUMMARY

In an embodiment, a method is provided for predicting occupancy of a parking area. A request for data relating to occupancy of the parking area is received. One or more entities within a first predefined distance of the parking area are identified. At least one activity classification code for each of the one or more first entities is identified. A predicted occupancy for the parking area is calculated as a function of the activity classification codes. The first predicted occupancy for the parking area is transmitted.

In an embodiment, an apparatus is provided for predicting occupancy of a parking area. The apparatus includes at least one processor at least one memory. The apparatus is configured to store historical data relating to an occupancy level for a plurality of parking areas and identify a plurality of economic entities within a predefined distance of each of the plurality of parking areas. Each economic entity of the plurality of economic entities includes an economic activity code stored in the memory. The apparatus is further configured to identify one or more relationships between the historical data and the economic activity codes for each of the plurality of parking area and generate an occupancy prediction for a requested parking area based on one or more economic entities within the predefined distance of the requested parking area, economic activity codes of the one or more economic entities, and the one or more relationships.

In an embodiment, a non-transitory computer readable medium is provided for predicting occupancy of a parking area. The medium includes instructions configured to receive a request for map data relating to a destination. Predicted parking occupancy data is identified for one or more parking areas within a set distance of the destination. The predicted parking occupancy data is calculated by a parking occupancy model generated from activity classifications of one or more entities within a predefined distance of each of the one or more parking areas. A geographic map is rendered including at least one parking area of the one or more parking areas with a predicted parking occupancy.

BRIEF DESCRIPTION OF THE DRAWINGS

Exemplary embodiments of the present invention are described herein with reference to the following drawings.

DETAILED DESCRIPTION

Embodiments described herein provide systems and methods to predict the availability of parking for a location. The system uses machine learning to identify patterns between activity classification codes and historical actual parking data. The patterns may be used to predict the availability of parking for a location when there is no real-time data available for the parking area. The parking occupancy predictions may be used in a navigation system to generate efficient routing decisions.

Parking may be a primary influencer of a decision to visit a destination. Drivers may be willing to walk no more than a certain distance from a parking spot to a desired destination. The availability of parking in an area may thus be influenced by the economic area within the specified distance. The number of parking spots may be balanced against the economic activity to determine if an open spot is to be expected. For example, if there are four businesses that are served by ten parking spots, the economic activity of the four businesses will determine if the ten spots are used or empty at a point in time. The type and needs of the businesses may include diverse economic activity. Each of the four businesses may have different parking needs for different time periods. A coffee shop may require additional parking in the morning, a daycare center may require parking in the afternoon, a restaurant may require parking in the evening, an apartment may require parking during non-work hours. The number of parking spots may be easily identifiable, but the economic activity may be difficult to assess due to the number and variety of potential businesses.

Navigation systems may include data that describes destinations and businesses. For example, navigation systems may include detailed map information such as point of interest data. The point of interest data may include point of interest records including a type (e.g., the type of point of interest, such as restaurant, hotel, city hall, police station, historical marker, ATM, golf course, etc.), location of the point of interest, a phone number, hours of operation, etc. The point of interest data may be presented to a user on a map display or in search results. For example, a user may request all restaurants within five miles of the user's current location. The navigation system may search the stored point of interest data to provide the list of restaurants to the user. Point of interest data may be collected by users (such as reviews), business (business information such as phone numbers, hours of operations), or from surveys or mapping applications for example.

Figure 1:
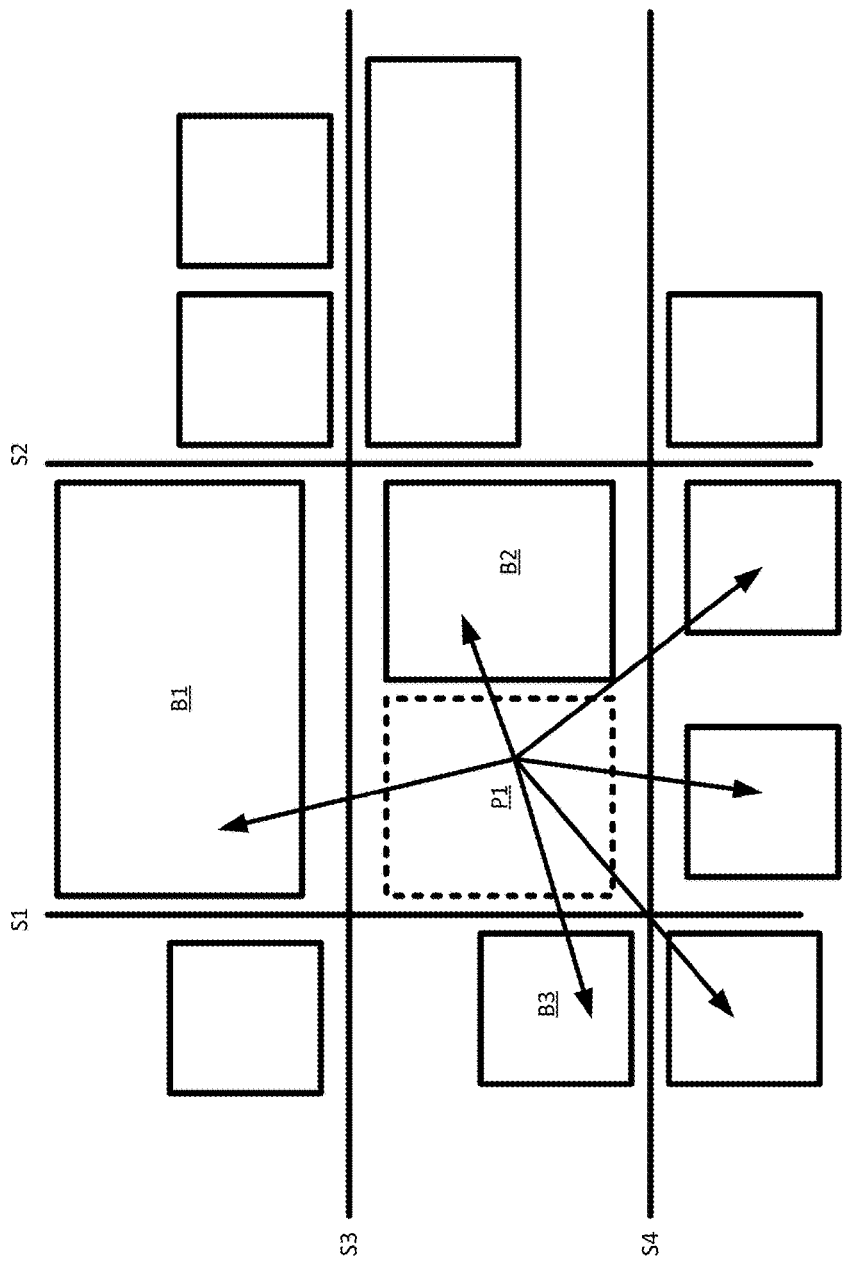
FIG. 1 illustrates an example map of a geographic region.

FIG. 1 illustrates an example map with three locations B1, B2 and B3 at their respective locations. Point of interest data may be available for B1, B2 and B3. B1 may be a grocery store, B2 and B3 may be restaurants. FIG. 1 includes a roadway network with streets S1-S4. FIG. 1 further has eight locations (unlabeled) that have not been identified as points of interest. The unidentified locations may, for example, be vacant, have an unknown purpose such as an unlisted office, or be a non-public building such as a residence or apartment building. FIG. 1 further includes a parking area P1. The parking area may represent a plurality of parking spots. The arraignment of the spots may include a surface lot, a multi layered parking structure, on or off street parking, or other arraignments. In the example of FIG. 1, the parking area may represent a surface lot between S3 and S4 off of S1. The availability of parking at an area may be affected by the entities around the parking area. A business, for example, may have an influence on parking areas within a certain distance. The parking area P1 may provide parking for the businesses on S3, S4, and S1, for example as depicted, the three identified locations B1, B2, and B3 and three unidentified locations. Points of interest data surrounding a parking area could be used to predict the usage of the parking areas. However, attempting to use the point of interest data surrounding the parking area does not provide accurate results. Point of interest data has several drawbacks that prevent point of interest data from being used effectively as a predictor of parking availability.

Point of interest data may not be standardized. Point of interest data may be collected or solicited openly. Points of interest, for example, may not be subjected to a screening process. Similar businesses may be categorized or labeled wildly differently. In the example of FIG. 1 above, each of the points of interest may have information derived from different sources. Information regarding building B1 may have been input by the owner of the grocery store, building B2 by a customer of the restaurant, building B3 by a third party that collects information about restaurants. Point of interest data may not be up to date or conversely poorly entered. In addition to not being standardized, point of interest data may not be verified. Many businesses fold or turn over, but vestiges may remain in point of interest databases.

Point of interest data may not include entities that affect parking availability. Point of interest data includes data for commercial or public locations. Data for restaurants, hotels, city hall, police stations, historical markers, ATMs, golf courses, or other locations may be included in point of interest data. While each of these entities affect parking availability, they only represent a segment of potential factors. Other entities such as residential buildings or offices may affect the availability of parking, but may not be well represented in point of interest data. In the example of FIG. 1 above, multiple buildings are not labeled or identified as points of interest. One or more of the buildings may be empty and as such not affect parking, but others may have not been labeled, are non-commercial buildings, or are new. The unidentified buildings, even though not points of interests, may affect parking in the area.

Points of interest data may even confound analysis when the same name is given to different locations owned by the same business entity. Confounding information may be highly detrimental to machine learning models. Having two locations with the same name but different economic activities may misdirect a learning process. Classification of the locations may cover multiple economic activities but affect parking in these areas differently. Better classifications may lead to more effective learning models. For example, a store in a chain of stores where one location has a primary economic activity of selling groceries and the other has a primary economic activity of being a big box store, may be treated differently by an accurate classification system.

Point of interest data may lack a breadth of description required for predicting parking availability. Point of interest data may apply labels to destinations. For example, identifying a retail store at a location. Retail stores, however may vary in economic activity and as such parking requirements. One retail store may only see tens of customers a day while another may see hundreds. The two restaurants in FIG. 1, above may serve different numbers of customers, B2 may be a fast food restaurant, while B3 is a fine dining restaurant. Point of interest data may not make the distinction between the two restaurants and as such, underestimate or overestimate the parking availability. Alternatively, both restaurants may be similar in descriptions, e.g. both B2 and B3 are fast food restaurants, but serve different numbers of people each day (or at different times of the day). Certain businesses may offer multiple services that, for example, change throughout a day. In the example of FIG. 1, the grocery store B1 may include a bakery, a coffee shop, and a deli in addition to offering other grocery services. Point of interest data may not consider the multiple roles (or not be able to weight the roles). A location may provide a single service in the morning, but then two or more services in the afternoon. A location may provide a primary service and multiple secondary services. Point of interest data does not differentiate between such locations.

Point of interest data is therefore not useful for predicting the availability of parking. However, an alternative to using point of interest data is to use economic activity signifiers. Economic activity may be data or labels that are based on activity that may be financial quantified. Economic activity, e.g. shopping, dining out, renting an apartment, etc., may be a driving force for drivers that park in an area. The economic activity may not just be based on total revenue, but also on the type of economic activity.

Embodiments provide an automated method for predicting the availability of parking by using economic activity data and more specifically, economic activity codes. The predictions do not use real time sensor data or real time observations, but rather use patterns between previously identified parking vacancies and economic activity data within a predetermined distance of a parking area.

Figure 2:
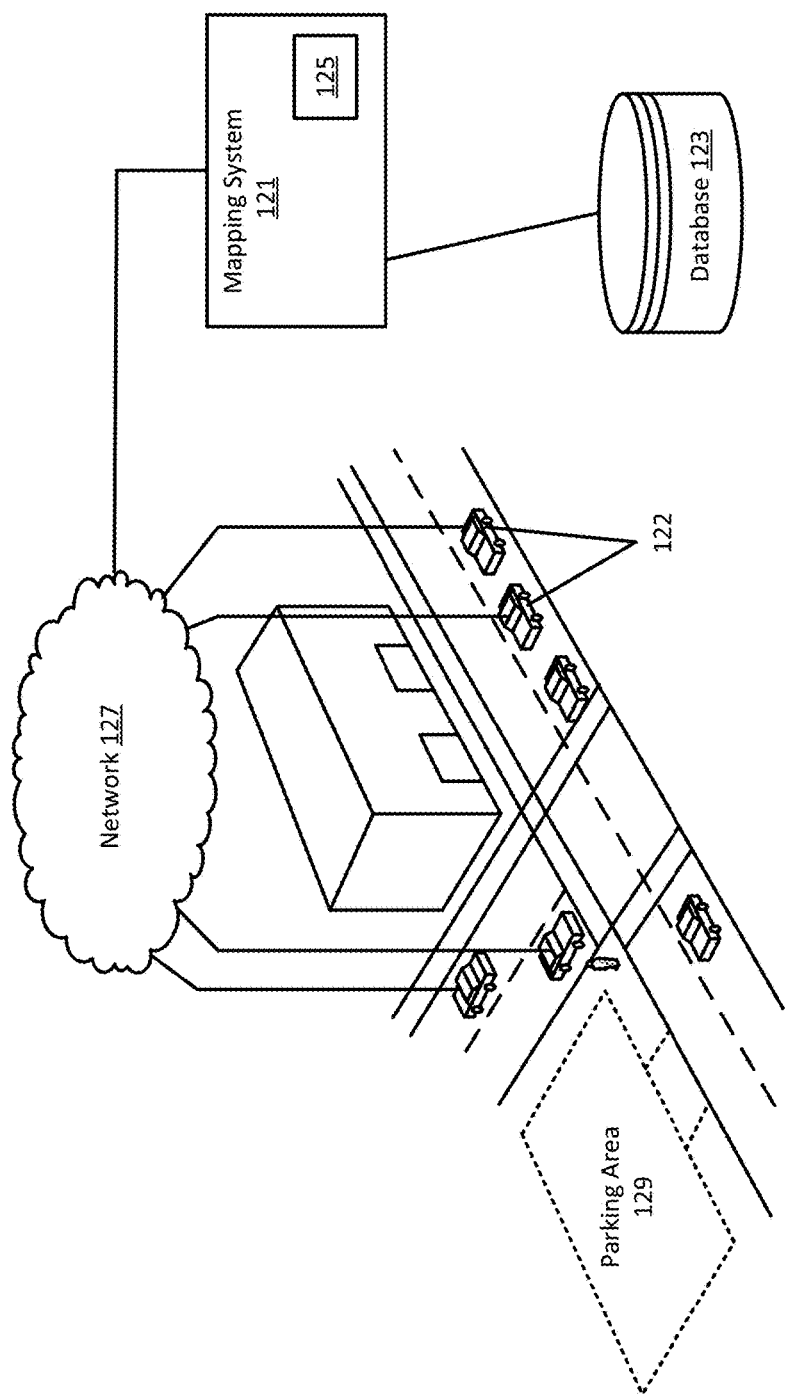
FIG. 2 illustrates an example system for predicting parking occupancies.

FIG. 2 depicts a system for predicting the availability of parking. The system includes one or more devices 122, a network 127, and a mapping system 121. FIG. 2 further depicts a roadway network with a parking area 129. The mapping system 121 may include or may be connected to a database 123 (also referred to as a geographic database or map database). The mapping system 121 may include one or more servers 125. Additional, different, or fewer components may be included.

The one or more devices 122 may include probe devices, probe sensors, or other devices 122 such as personal navigation devices 122 or connected vehicles. The mapping system 121 may communicate with the devices 122 through the network 127. The mapping system 121 may also receive data from one or more systems or services that may be used to identify historical parking availability. The devices 122 may be a mobile device or a tracking device that provides samples of data for the location of a person or vehicle. The devices 122 may include mobile phones running specialized applications that collect location data as the devices 122 are carried by persons or things traveling the roadway system. The devices 122 may also be integrated in or with a vehicle. The devices 122 may be configured to collect and transmit data including when a vehicle is parked. The devices 122 may be configured to present a route to one or more parking areas. The devices 122 may be configured to present levels of parking availability to a user or vehicle.

The mapping system 121 and devices 122 are connected to the network 127. The devices 122 may receive or transmit data through the network 127. The mapping system 121 may receive or transmit data through the network 127. The mapping system 121 may also transmit paths, routes, or predicted parking data through the network 127. The network 127 may include wired networks, wireless networks, or combinations thereof. The wireless network may be a cellular telephone network, LTE (Long-Term Evolution), 4G LTE, a wireless local area network, such as an 802.11, 802.16, 802.20, WiMax (Worldwide Interoperability for Microwave Access) network, or wireless short range network. Further, the network 127 may be a public network, such as the Internet, a private network, such as an intranet, or combinations thereof, and may utilize a variety of networking protocols now available or later developed including, but not limited to transmission control protocol/internet protocol (TCP/IP) based networking protocols.

The mapping system 121 may include multiple servers 125, workstations, databases, and other machines connected together and maintained by a map developer. The mapping system 121 may be configured to identify or predict an availability of parking in one or more parking areas based on economic activity. The mapping system 121 may also be configured to generate routes or paths between two points (nodes) on a stored map. The mapping system 121 may be configured to provide up to date information and maps to external geographic databases or mapping applications. The mapping system 121 may be configured to encode or decode map or geographic data. Economic activity and parking availability predictions may be stored by the mapping system 121 in the geographic database 123 as link, segment, or node attributes. The economic activity and parking availability predictions may be stored by the mapping system 121 using geographic coordinates such as latitude and longitude.

The mapping system 121 may include one or more server(s) 125. A server 125 may be a host for a website or web service such as a mapping service and/or a navigation service. The mapping service may provide maps generated from the geographic data of the database 123, and the navigation service may generate routing or other directions from the geographic data of the database 123. The mapping service may also provide information generated from attribute data included in the database 123. The server 125 may also provide historical, future, recent or current traffic conditions for the links, segments, paths, or routes using historical, recent, or real time collected data. The server 125 may be configured to analyze economic activity within a predefined distance of a parking area to predict parking availability. The server 125 may be configured to analyze ground truth (actual) historical parking data and economic activity data to generate a model that may be used to predict parking availability for parking areas. The server 125 may be configured to generate a route to a parking area that is within a distance of a destination that is predicted to have at least one open parking spot.

Figure 3:
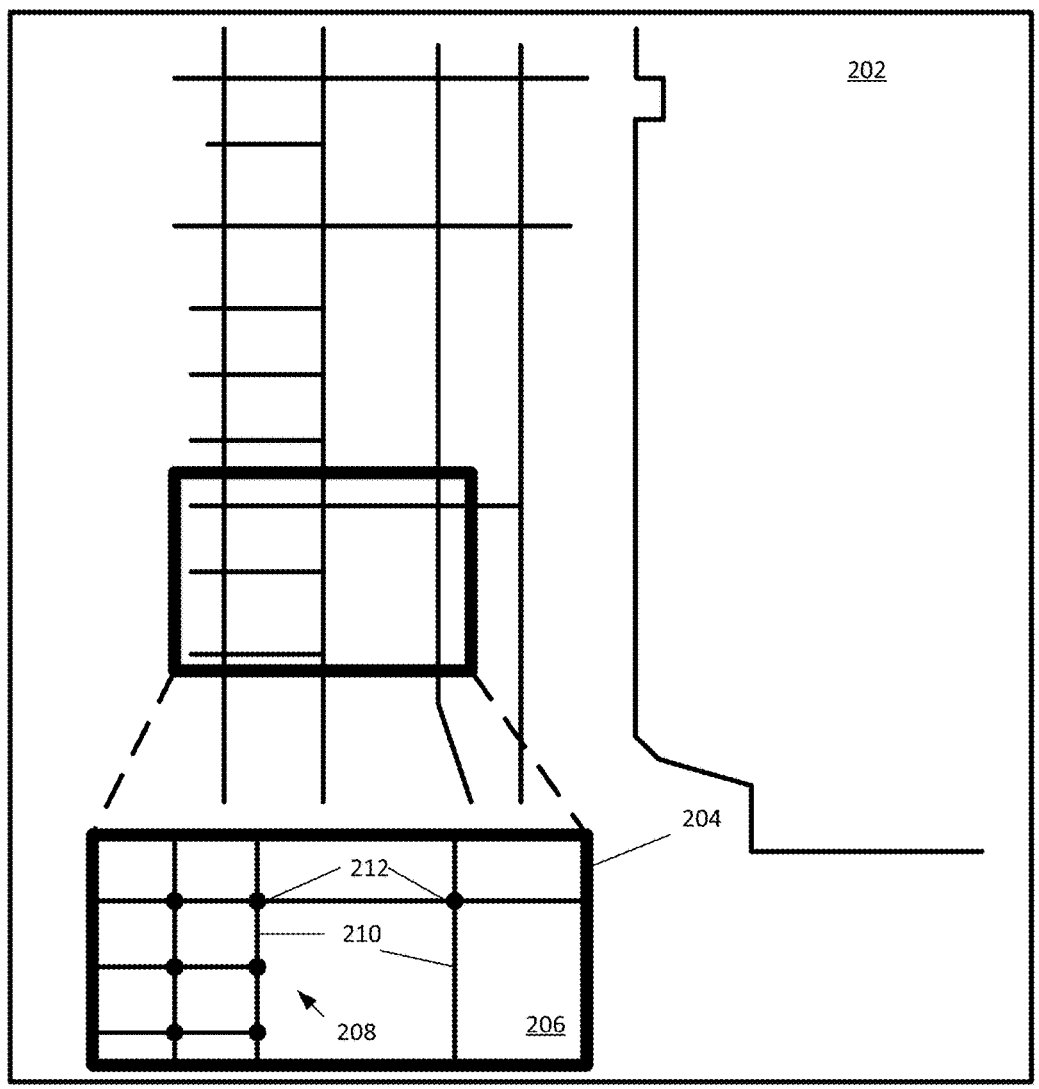
FIG. 3 illustrates an example map of a geographic region.

The mapping system 121 includes a geographic database 123. The geographic database 123 may include data for an economic taxonomy system that classifies business by economic activity. In order to provide navigation related features and functions to the end user, the mapping system 121 uses the geographic database 123. The geographic database 123 includes information about one or more geographic regions. FIG. 3 illustrates a map of a geographic region 202. The geographic region 202 may correspond to a metropolitan or rural area, a state, a country, or combinations thereof, or any other area. Located in the geographic region 202 are physical geographic features, such as roads, points of interest (including businesses, municipal facilities, etc.), lakes, rivers, railroads, municipalities, etc.

FIG. 3 further depicts an enlarged map 204 of a portion 206 of the geographic region 202. The enlarged map 204 illustrates part of a road network 208 in the geographic region 202. The road network 208 includes, among other things, roads and intersections located in the geographic region 202. As shown in the portion 206, each road in the geographic region 202 is composed of one or more road segments 210. A road segment 210 represents a portion of the road. Each road segment 210 is shown to have associated with it two nodes 212; one node represents the point at one end of the road segment and the other node represents the point at the other end of the road segment. The node 212 at either end of a road segment 210 may correspond to a location at which the road meets another road, i.e., an intersection, or where the road dead ends.

Figure 4:
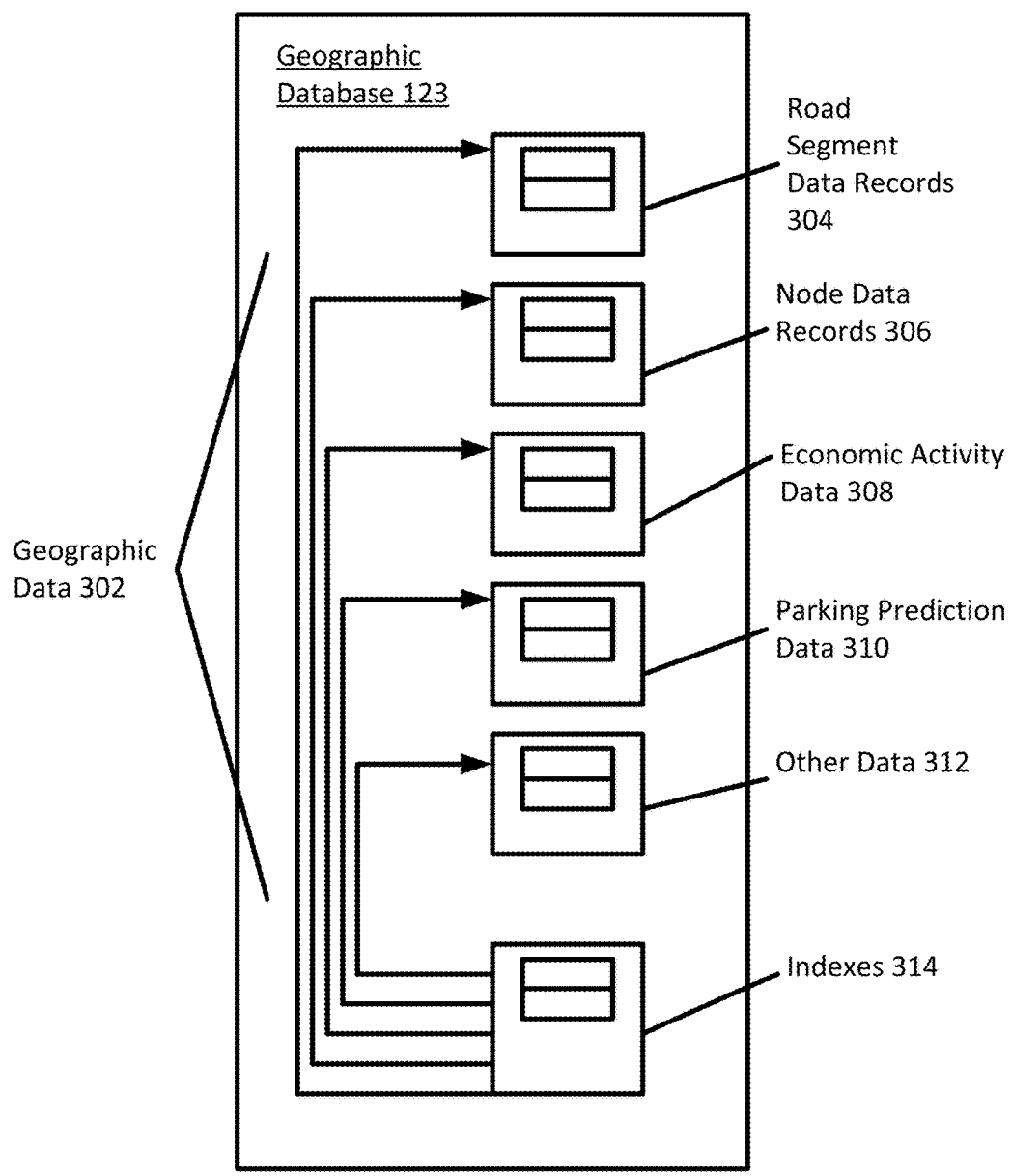
FIG. 4 illustrates an example geographic database.

As depicted in FIG. 4, in one embodiment, the geographic database 123 contains geographic data 302 that represents some of the geographic features in the geographic region 202 depicted in FIG. 3. The data 302 contained in the geographic database 123 may include data that represent the road network 208. In FIG. 4, the geographic database 123 that represents the geographic region 202 may contain at least one road segment database record 304 (also referred to as "entity" or "entry") for each road segment 210 in the geographic region 202. The geographic database 123 that represents the geographic region 202 may also include a node database record 306 (or "entity" or "entry") for each node 212 in the geographic region 202. The terms "nodes" and "segments" represent only one terminology for describing these physical geographic features, and other terminology for describing these features is intended to be encompassed within the scope of these concepts.

The geographic database 123 may include other kinds of data 306-312. The other kinds of data 312 may represent other kinds of geographic features or anything else. The other kinds of data may include point of interest data. For example, the point of interest data may include point of interest records comprising a type (e.g., the type of point of interest, such as restaurant, hotel, city hall, police station, historical marker, ATM, golf course, etc.), location of the point of interest, a phone number, hours of operation, etc. In addition to or as an alternative to point of interest data, the geographic database 123 may include economic activity data 308. The economic activity data 308 may include economic activity codes, revenue data, employee data, rental information, among other types of data that may be used to describe the economic function of a location. The geographic database 123 may include parking prediction data 310 for one or more parking areas. The parking prediction data 310 may be stored as data that indicates a likelihood for a vacant parking spot in the area for a time period.

The geographic database 123 also includes indexes 314. The indexes 314 may include various types of indexes that relate the different types of data to each other or that relate to other aspects of the data contained in the geographic database 123. For example, the indexes 314 may relate the nodes in the node data records 306 with the end points of a road segment in the road segment data records 304. As another example, the indexes 314 may relate economic activity data in the other data records 312 with a road segment in the segment data records 304 or a geographic coordinate. The indexes 314 may store and relate parking areas with parking availability data. An index 314 may, for example, store data relating to one or more parking areas and related economic activity data for each parking area.

Figure 5:
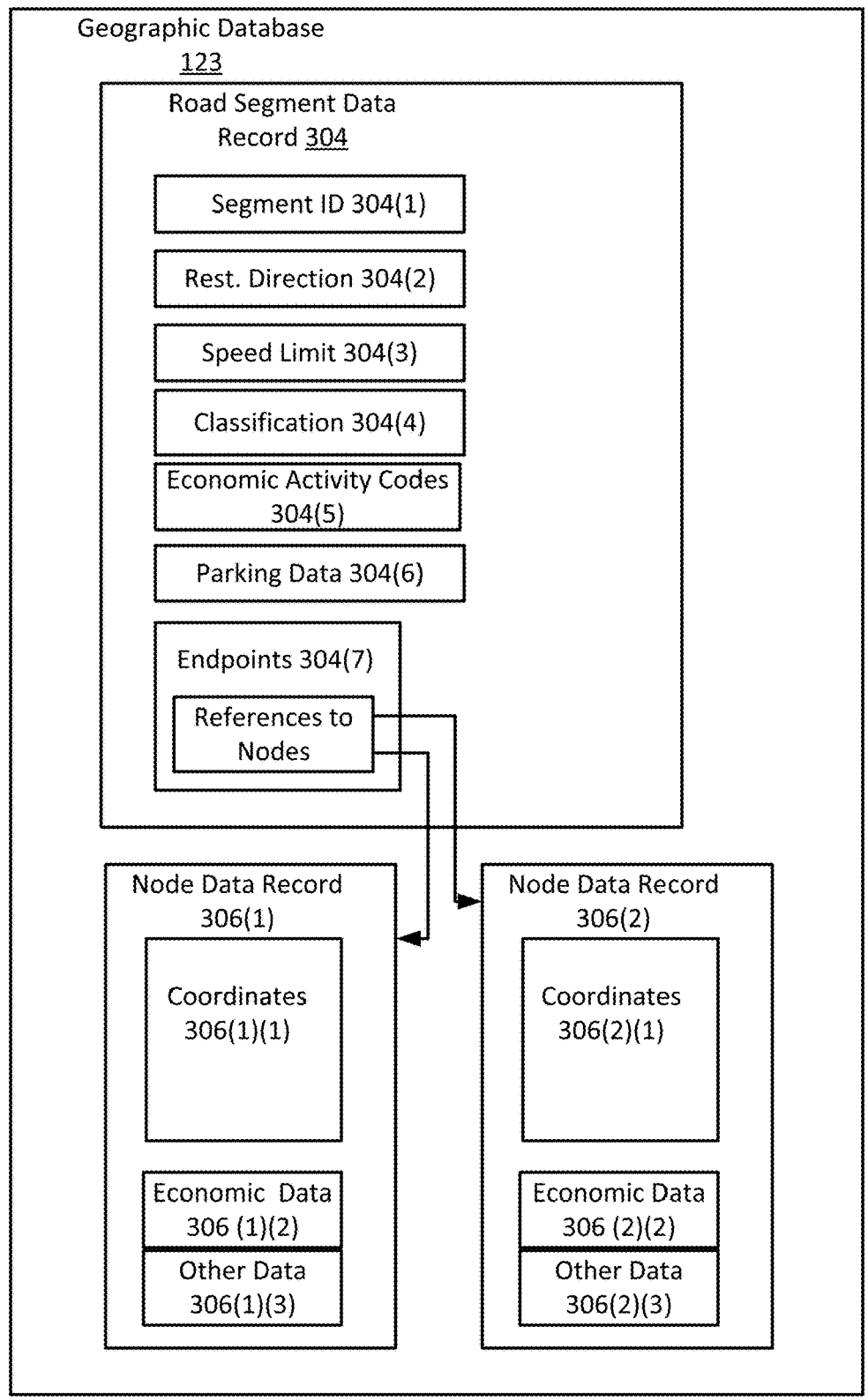
FIG. 5 illustrates an example geographic database.

FIG. 5 shows some of the components of a road segment data record 304 contained in the geographic database 123 according to one embodiment. The road segment data record 304 may include a segment ID 304(1) by which the data record can be identified in the geographic database 123. Each road segment data record 304 may have associated with it information (such as "attributes", "fields", etc.) that describes features of the represented road segment. The road segment data record 304 may include data 304(2) that indicate the restrictions, if any, on the direction of vehicular travel permitted on the represented road segment. The road segment data record 304 may include data 304(3) that indicate a speed limit or speed category (i.e., the maximum permitted vehicular speed of travel) on the represented road segment. The road segment data record 304 may also include classification data 304(4) indicating whether the represented road segment is part of a controlled access road (such as an expressway), a ramp to a controlled access road, a bridge, a tunnel, a toll road, a ferry, and so on. The road segment data record may include data that indicates the accessibility of a parking area, for example whether there is on-street parking or an entrance to an off-street parking area.

Referring back to FIG. 4, economic activity data may be stored as separate records 308, 310 or in road segment data records 304. The economic activity for an entity may be retrieved from or derived from an economic taxonomy system. The economic taxonomy system may be stored in the geographic database 123. One or more economic taxonomy systems may be used. Example systems include the North American Industry Classification system (NAIC), the standard industrial classification system (SIC), and the International Standard Industrial Classification of All Economic Activities (ISIC). These and other classification systems label business locations with one or more classifications or codes. Other classification systems that may be used and stored in the geographic database 123 include: NACE—Statistical classification of economic activities in the European Communities, CPC—United Nations' Central Product Classification, CPA—European Classification of Products by Activity, HS—Harmonized Commodity Description and Coding System, managed by the World Customs Organization, CN—Combined Nomenclature, a European classification of goods used for foreign trade statistics, SITC—the United Nations' Standard International Trade Classification, an international classification of goods used for foreign trade statistics, or PRODCOM—the classification of goods used for statistics on industrial production (mining and manufacturing) in the EU compiled by the PRODCOM committee (directly linked to CPC). Alternative classification systems may be used.

Classification systems may use tiered based classification codes. For example, the ISIC system, each activity is first assigned a section. The section is divided into divisions. The divisions may be divided into groups. The groups may be divided into Classes. The classification system may be arraigned in a hierarchal structure with each level describing more specific economic activity. For example, the ISIC Rev.4 code G4641 may represent Wholesale of food, beverages and tobacco using the following structure:

Section: G—Wholesale and retail trade; repair of motor vehicles and motorcycles

Division: 46—Wholesale trade, except of motor vehicles and motorcycles

Group: 464—Wholesale of household goods

Class: 4641—Wholesale of textiles, clothing, and footwear

For the ISIC system, Class 4641 includes the—wholesale of yarn; wholesale of fabrics; wholesale of household linen etc.; wholesale of haberdashery: needles, sewing thread etc.; wholesale of clothing, including sports clothes; wholesale of clothing accessories such as gloves, ties, and braces; wholesale of footwear; wholesale of fur articles; wholesale of umbrella. The classes may be further divided into subclasses. For example, in the NAICS system, the subclass 423220 represents linens (bed, bath, table, etc.) and the subclass 424990 represents yarn, textile bags, and felt, both of which are subclasses to a textiles class.

In an embodiment, the mapping system 121 may supplement additional categories (e.g. sections, divisions, group, classes, or classes), create additional categories, or combine classification systems to generate a master classification system. For example, the mapping system 121 may assign subclasses to each of the classes based on revenue or employee data. The mapping system 121 may combine economic activities that have similar parking profiles or expected parking occupancies.

Classification systems may be more specific than point of interest data. For example, ISIC codes are more specific to the business. In an example, a business entity that serves alcohol may provide different services. Each of the different varieties may affect parking differently. For example, different drinking establishments may include a laundry bar—where one can buy and alcoholic beverage while waiting for cloths to dry; a bar or tavern for music, a bar, places to sit; a night club for dancing and entertainment; a sit down "table cloths and salad forks" dinner establishment—where wine may be drunk at dinner; or winery among others. Each establishment may be assigned a different classification (or secondary classification) that is standardized across each the entire data set. For the point of interest data, the labels may less granular (e.g. only one label for all of the examples) or have no standardization across the labels (e.g. the data may not be useful for modeling). Secondary classifications may be assigned to entities by determining each of the activities and then comparing the share of activity of each. The share of activity may be based on metric such as revenue, employees, advertisements, or other metrics.

Classification may include label or codes for economic entities that are not covered by points of interests. For example, apartments or residences may be coded in classification systems but are excluded as being non-public for point of interest systems. Classification systems may include multiple different codes for the same business. For example, a chain convenience store may offer different services that affect parking different. While all the convenience stores are under the same name, one may offer food while one may offer both cooked food while another may offer both food and gas. One hardware rents trucks, while another does not. The one that rents trucks has additional codes.

Economic activity codes provide a framework that may be standardized over large regions. In addition, there is a long history of using the codes to partition statistically economic activity. Many years of work have gone into determining the codes and partitions. The classification systems may be updated regularly and checked for errors. For example, the North American Industry Classification System (NAICS) is a standard used by Federal statistical agencies in classifying business establishments for the purpose of collecting, analyzing, and publishing statistical data related to the U.S. business economy. An establishment, in NAICS United States, is generally a single physical location where business is conducted or where services or industrial operations are performed (for example, a factory, mill, store, hotel, movie theater, mine, farm, airline terminal, sales office, warehouse, or central administrative office). Records may identify distinct and separate economic activities performed at a single physical location (e.g., shops in a hotel). The retailing activities, operated out of the same physical location as the hotel, are identified as separate establishments and classified in the Retail Trade sector, while the hotel is classified in the Accommodation subsector. In such cases, each activity is treated as a separate establishment provided: (1) no one industry description in the classification includes such combined activities; (2) separate reports can be prepared on the number of employees, the employees' wages and salaries, sales or receipts, and expenses; and (3) employment and output are significant for both activities.

The Standard Industrial Classification (SIC) is an alternative classification system for the U.S. The SIC is updated by the Bureau of Labor Statistics every three years and uses SIC to report on work force, wages, and pricing issues. The Social Security Administration assigns SIC codes to businesses based on the descriptions provided by employers under the primary business activity entry on employer ID applications.

Economic classification systems have advantages over point of interest data. Economic classification systems may be more specific to economic business activities and sub activities. Economic classification systems include years of work by nations to get the partitioning of economic activity correct. Economic classification systems may include multiple codes for a single location—not a single business—one business might represent multiple activities or different activities in different locations. Economic classification systems may be valid and standardized over a large area, even globally.

The economic classification systems may include locational data for the economic entities. The locational data may include an address or geographic coordinates such as latitude and longitude. Multiple entities may be located at an address or location.

In an embodiment, the economic classifications may be supplemented with POI data, for example, locations that have no discernable economic activity, but still drive parking needs. The non-economic locations may include schools, parks, museums, monuments, etc. The non-economic locations may be assigned a classification code by the mapping system and used to predict the occupancy of a parking area. A small park, for example, may be assigned a classification code, while a larger park may be assigned a different similar classification code. In an embodiment, non-economic locations may be derived from the predicted occupancy data.

The geographic database 123 may include road segment data records 304 (or data entities) that describe features such as the economic activity codes 304(5) or parking vacancy predictions 304(6). The predicted parking vacancy data for each parking area (or road segment) may be stored as a field or record using a scale of values such as from 1 to 100 (1 being a low chance of a parking vacancy, 100 being almost certain that there is a parking vacancy). The predicted parking vacancy data may be stored using categories such as low, medium, high chances of a parking vacancy on a road segment. Additional schema may be used to describe the predicted parking vacancy data. The attribute data may be stored in relation to a link/segment 304, a node 306, a strand of links, an area, or a region. The geographic database 123 may store information or settings for display preferences. The geographic database 123 may be coupled to a display. The display may be configured to display the roadway network and data entities using different colors or schemes. The geographic database 123 may provide different display information relating to where open parking spots may exist, for example.

The road segment data record 304 also includes data 304(7) providing the geographic coordinates (e.g., the latitude and longitude) of the end points of the represented road segment. In one embodiment, the data 304(7) are references to the node data records 306 that represent the nodes corresponding to the end points of the represented road segment.

The road segment data record 304 may also include or be associated with other data 304(7) that refer to various other attributes of the represented road segment. The various attributes associated with a road segment may be included in a single road segment record, or may be included in more than one type of record which cross-references to each other. For example, the road segment data record 304 may include data identifying what turn restrictions exist at each of the nodes which correspond to intersections at the ends of the road portion represented by the road segment, the name, or names by which the represented road segment is identified, the street address ranges along the represented road segment, and so on.

FIG. 5 also shows some of the components of a node data record 306 that may be contained in the geographic database 123. Each of the node data records 306 may have associated information (such as "attributes", "fields", etc.) that allows identification of the road segment(s) that connect to it and/or it's geographic position (e.g., its latitude and longitude coordinates). For the embodiment shown in FIG. 5, the node data records 306(1) and 306(2) include the latitude and longitude coordinates 306(1)(1) and 306(2)(1) for their node, and economic data 306(1)(2) and 306(2)(2). The node data records 306(1) and 306(2) may also include other data 306(1)(3) and 306(2)(3) that refer to various other attributes of the nodes such as parking availability or for example, a number of parking spots within a predefined range of the node.

The geographic database 123 may be maintained by a content provider (e.g., a map developer). By way of example, the map developer may collect geographic data to generate and enhance the geographic database 123. The map developer may obtain data from sources, such as businesses, municipalities, or respective geographic authorities. In addition, the map developer may employ field personnel to travel throughout the geographic region to observe features and/or record information about the roadway. Remote sensing, such as aerial or satellite photography, may be used. The database 123 is connected to the server 125.

The geographic database 123 and the data stored within the geographic database 123 may be licensed or delivered on-demand. Other navigational services or traffic server providers may access the traffic data and the predicted parking availability data stored in the geographic database 123. Data including the predicted parking availability data may be broadcast as a service.

Figure 6:
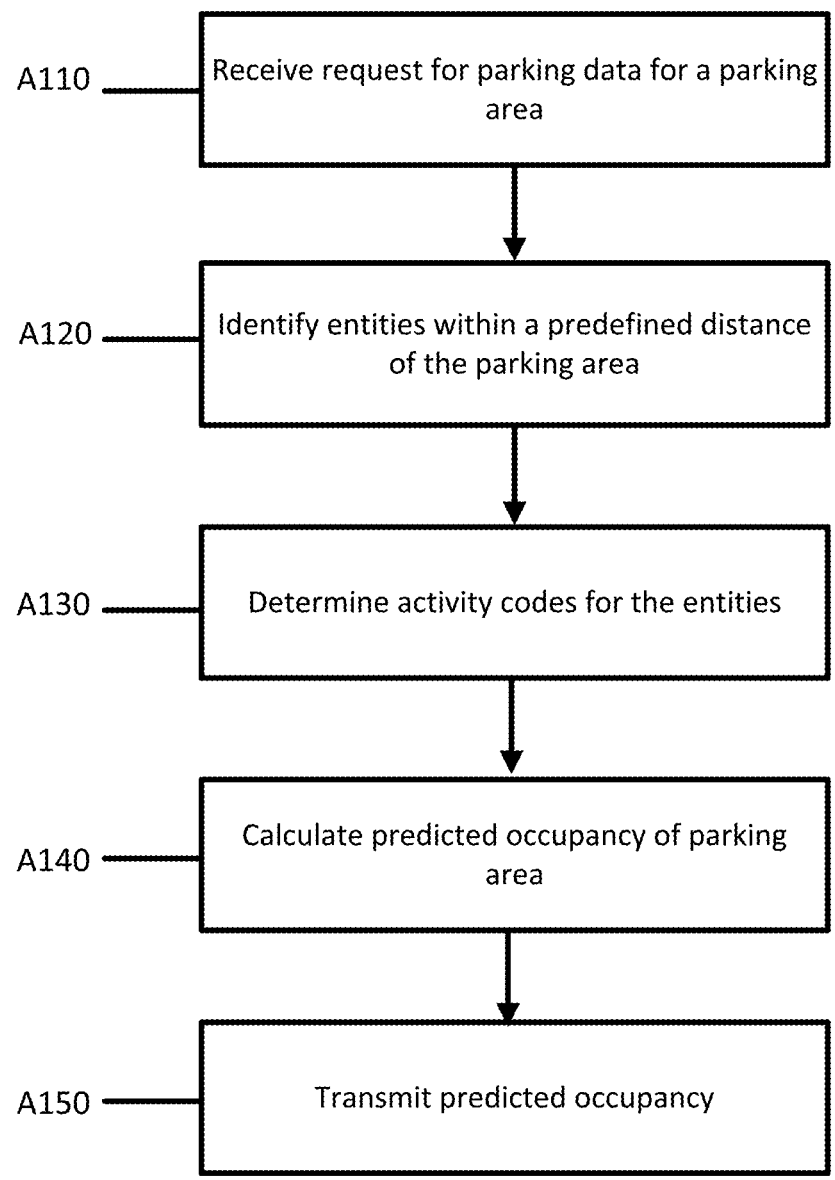
FIG. 6 illustrates an example workflow for predicting parking occupancies.

FIG. 6 illustrates an example flow chart for predicting occupancy of a parking area. As presented in the following sections, the acts may be performed using any combination of the components indicated in FIG. 2, FIG. 10, or FIG. 12. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A110, the mapping system 121 receives a request for data relating to occupancy of a parking area. Devices 122 may request routes or predicted parking availability from a mapping system 121. The data relating to occupancy of a parking area may be used by navigations systems to set a destination for a vehicle to park at. The data relating to occupancy of a parking area may further include data relating to multiple parking areas, for example, parking areas within a walking distance of a user requested destination.

Figure 7:
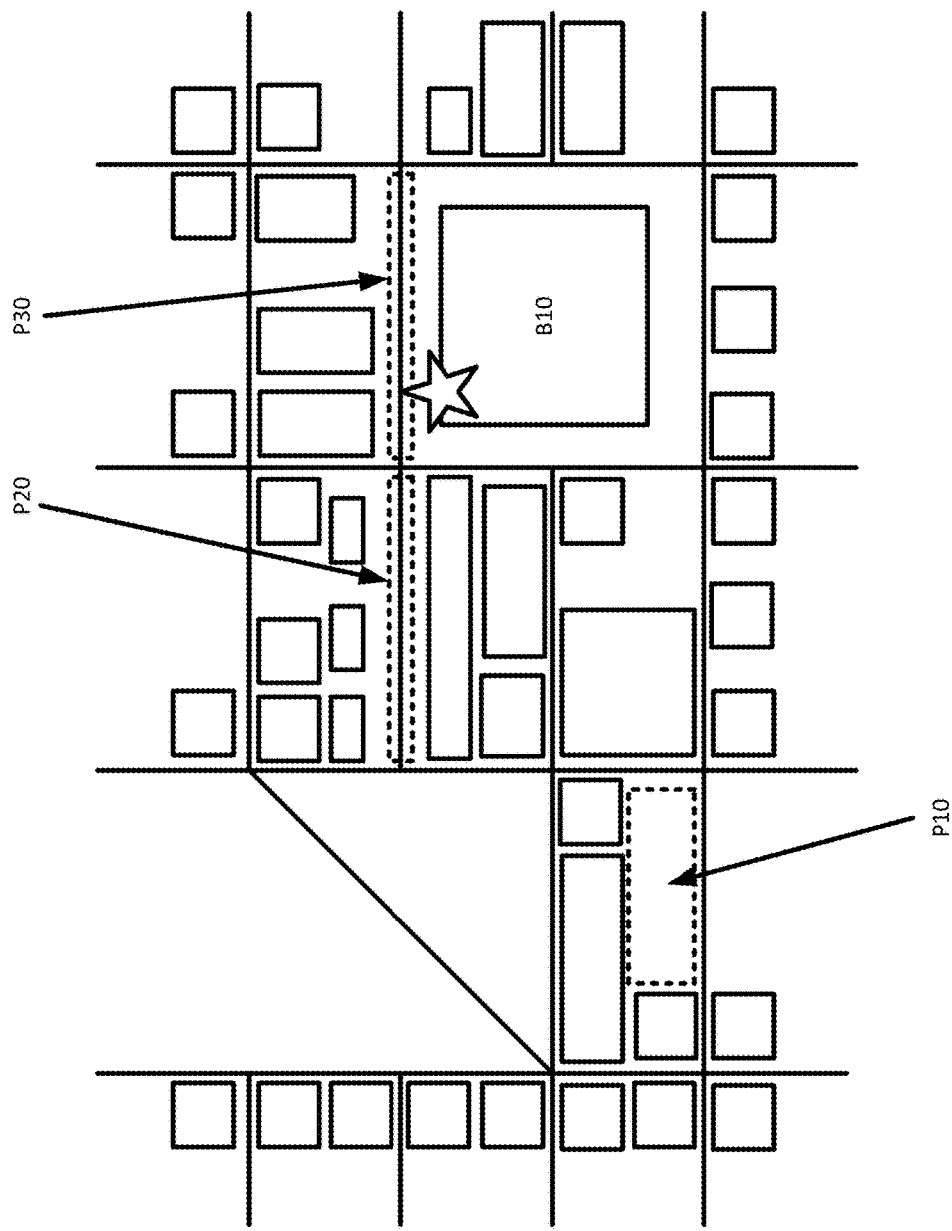
FIG. 7 illustrates an example map including a plurality of parking areas.

FIG. 7 depicts an example map of a region. FIG. 7 includes three parking areas P10, P20, and P30. A navigation system may request a route from the mapping system 121. For example, the navigation system transmits a current location (or entered location) and a desired destination (depicted by the star). The mapping system 121 using one or more algorithms, generates a route form the current location to the destination. When generating the route, the mapping system 121 may use current roadway conditions such as traffic conditions or weather conditions for example. For a destination, for which a vehicle needs to be parked, the mapping system 121 may identify one or more potential parking areas within a specified distance. For example, a navigation system may request that the route end at a location (e.g. parking area) that is no more than 150 meters from the actual requested destination. In the example of FIG. 7, the destination may be an entrance of the building at location B10. Parking area P30 is adjacent to the B10 and as such, data relating to the availability of parking at P30 may be requested. In an embodiment, data for multiple parking areas may be requested, such as data for both P20 and P30. Parking area P20 also serves the location B10. The mapping system 121 may calculate a prediction of parking occupancy for both areas and transmit both predictions.

At act A120, the mapping system 121 identifies at least one entity within a predefined distance of the parking area. The plurality of entities that the parking area serves may represent a parking occupancy profile. Entities may be economic entities that represent businesses, organizations, or units that include some economic activity. Similar parking occupancy profiles may have similar occupancy patterns due to similar economic activity and as such, similar parking activity. Parking areas may have different shapes and sizes. Parking areas may include on street, off street, parking lots, parking structures, among other parking configurations. A parking area may be as small as a single space or may span tens or hundreds of parking spots. On street parking may include all of the parking along one side (or both sides) of a road segment. As depicted in FIG. 7, parking areas P20 and P30 may be on-street parking. Parking area P10 may be an off-street lot. Parking areas may be split into two or three or more areas if, for example, the road segment is long. Each parking area may include one or more geographic coordinates or geographic indicators that define the location of the parking area. In an embodiment, the parking areas may be defined by one or more road segments or nodes that are adjacent to the parking area. In another embodiment, the parking area may be defined by a geo fence or geographic coordinates. The parking area may be defined by a single geographic point.

The predefined distance for the parking area may be based on a distance for which the parking areas serves locations. For example, the predefined distance may be 150 meters which represents a potential distance that drivers are willing to park from their final destination. Alternative distances may be used depending on a region. In an embodiment, the predefined distance may be a walking distance from the parking area. The predefined distance may be based on a time to walk from the parking area. The predefined distance may be a radius or boundary around the parking area. The predefined distance may be measured from the parking area to an entrance to an entity.

Figure 8:
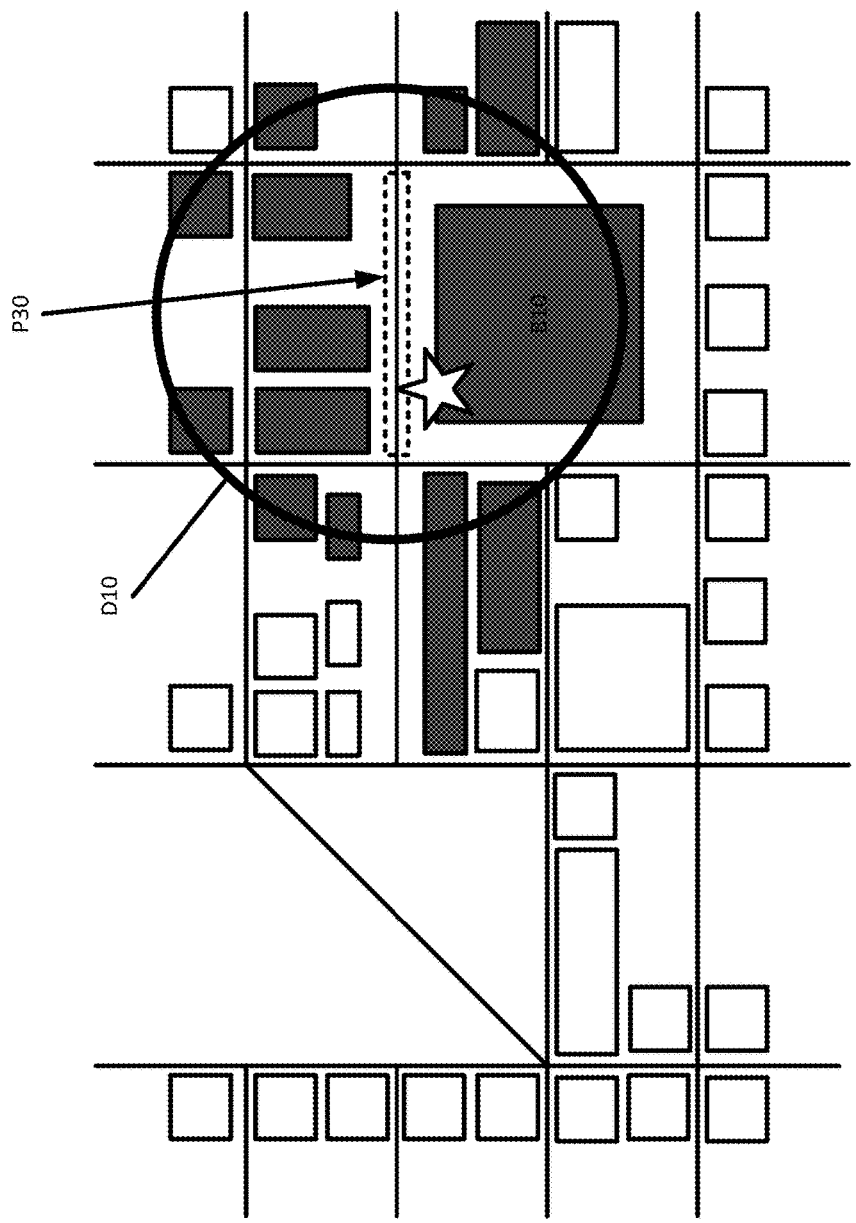
FIG. 8 illustrates example economic entities for a parking area.
Figure 9:
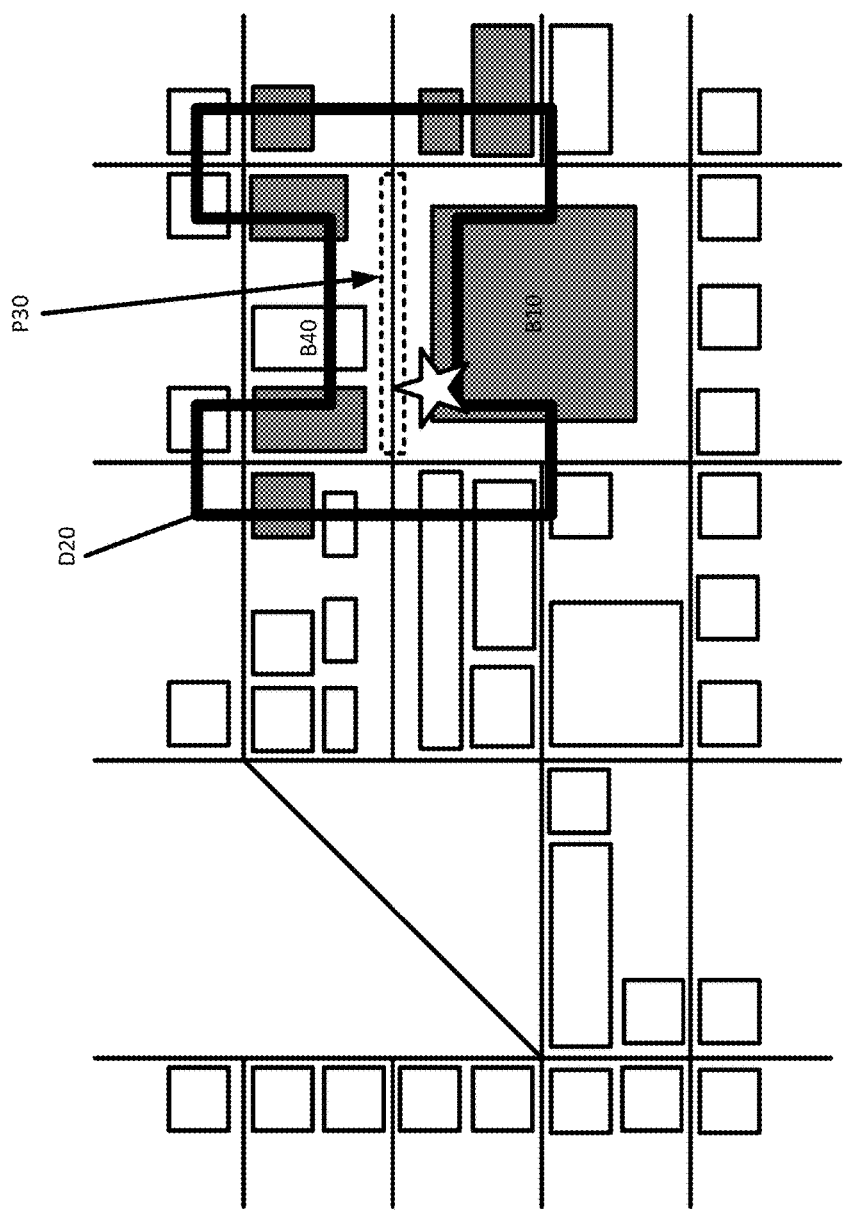
FIG. 9 illustrates example economic entities for a parking area.

FIG. 8 depicts a 150-meter radius D10 around a center point of the parking area P30. The economic entities within the 150-meter radius D10 have been shaded. The parking area P30, and any parking spots in the parking area P30, may be considered as primarily serving these economic entities. The group of shaded economic entities and the economic activity of these economic entities may represent an economic activity profile for the parking area. The radius D10 may represent a standard distance that a potential driver is willing to travel from a parking area to a destination. FIG. 9 depicts a boundary D20 that describes an area that includes locations within 5 minutes walking distance of the parking area. In this example, if B40 has an entrance opposite the parking area P30, then B40 may not be served by the parking area. Different mechanisms may be used for determining the predefined distance.

Data for each of the economic entities may be stored in the geographic database 123. Each economic entity may correspond to one or more nodes, road segments, or geographic coordinates. The location of the economic entity, may for example be based on an address of the economic entity or an address of an entrance for the economic entity. The locations of the economic entities may be retrieved or identified from an economic classification system that may keep track of a plurality of economic entities. The economic entity data for parking areas may be stored in the geographic database 123 as an economic entity profile for the parking area.

Each parking area may serve different types of locations. In the example of FIG. 7-9, the parking areas P10, P20 and P30 each serve different groups of locations. There may be overlap between the parking areas, however, each parking area may have a different occupancy profile. Even parking areas that are adjacent such as P20 and P30 may have different occupancy profiles. Parking area P20, for example, may be closer to a greenspace, and as such may have higher occupancy rates for certain time periods that parking area P30. Parking area P10 may server one or more drinking establishments, and as such may have an occupancy profile that is fuller later in the evening as opposed to P30 which may empty out after normal business hours.

At act A130, the mapping system 121 determines economic classifications for each of the economic entities. The mapping system 121 may store economic activity codes for one or more businesses. The mapping system 121 may store the codes with a geographic indicator for the economic entity. The geographic indicator may be an address, a geographic coordinate, or other indication of location. The economic classifications for each of the economic entities may be stored in the geographic database 123. The mapping system 121 may retrieve economic classifications for economic entities and match the entities to geographic locations.

By using economic activity codes rather than point of interest data, greater classification may be achieved. The increased depth of economic activity codes may provide more accurate predictability for a parking availability model. One such system of economic activity codes is the International Standard Classification of All Economic Activities (ISCI) published and maintained by the Department of Economic and Social Affairs of the United Nations Secretary. ISIC is an international reference classification of productive activities. The purpose of ISIC is to provide a set of activity categories that can be utilized for the collection and reporting of statistics according to such activities. The majority of countries around the world have used ISIC as their national activity classification or have developed national classifications derived from ISIC. In ISIC, multiple codes may be assigned to a business where each code describes an economic activity of the business and are ranked by the revenue. Alternative standardized classifications may be used.

In FIG. 8, the economic activity codes for each of the economic entities within the radius may be identified. In an embodiment, the economic entities may be ranked by distance to the parking area. The ranked entities may be weighted differently or excluded. For example, for a parking area with a large number of entities, the mapping system 121 may only consider the closest economic entities. In an embodiment, only certain types of economic entities may be used. For example, only those economic entities that are common to a region may be used. An obscure code may be excluded. Certain economic entities do not exist in a large enough quantity to be statistically significant. In an embodiment, obscure economic entities may be excluded or reassigned to a different economic code. The mapping system 121 may receive data from an organization, such as the Department of Economic and Social Affairs of the United Nations Secretary and reclassify certain economic entities either because the economic entities are obscure, indefinite, or not related to parking occupancy. The mapping system 121 may classify or reclassify certain locations such as parks, monuments, museums, or other non-economic locations that require parking.

A list of economic classification codes may be reduced in size using dimensionality reduction. Principal component analysis (PCA) is one method of dimensionality reduction. PCA is a statistical technique that is used to analyze the interrelationships among a large number of variables and to explain these variables in terms of a smaller number of variables, called principal components. Using PCA, the number of economic classification codes may be reduced to a manageable size.

The collection of economic classifications for the economic entities within a parking area provide a description of the parking needs. A different parking area with similar economic classification codes may have similar parking needs. Depending on the number of parking spots in both parking areas, the parking areas may have similar parking occupancy patterns for different times of the day.

At act A140, the mapping system 121 calculates a predicted occupancy for the parking area as a function of the economic classifications. The mapping system 121 may store a parking model that has been trained using machine learning on actual data (e.g. ground truth data) for one or more regions. The mapping system 121 may receive actual parking data (or vacancy data) from the one or more devices for one or more periods of time. The actual parking data may be used for training a machine learning model. Parking data for one or more areas may also be collected by mapping personal or by using parking sensors. The historical actual parking data for a region may be inputted into a machine learning model along with the economic classification codes for entities in the region. The mapping system 121 identifies patterns in the inputted data (relationships between the economic classification codes and parking availability) for the parking areas for different periods of time. For example, the mapping system 121 may identify that a parking area with entities with a particular set of economic codes may have parking vacancies for certain time periods. The mapping system 121 may then identify similar parking area with similar entities with similar economic codes. The mapping system 121 may predict that the similar parking areas may have similar vacancy patterns.

The predicted occupancy for a parking area may be calculated for different time periods. For example, a predicted occupancy may be predicted for each hour of a day (or shorter or longer time periods). The predicted occupancy may be calculated for different days of the week, for example, parking occupancies on a weekday may be different than parking occupancies on a weekend. Repeating events (or similar events) such as holidays may affect parking occupancy and as such, the mapping system 121 may calculate predicted occupancies for types of events separately than normal activity. For each parking area, the mapping system 121 may calculate and store a predicted occupancy for multiple times, regular events, and special events. Additional factors such as weather may be used in the model. Parking restrictions may be derived from the actual data and used to predict occupancy. For example, for two different parking areas with similar entities with similar economic activity, different parking occupancy patterns may indicate one or more restrictions or special circumstances for the parking areas. Parking restriction data may be input into the model to train the model more effectively.

Different modeling systems may be used to model the economic activity codes and parking occupancies. The relationships between the economic codes and actual parking vacancy data may be determined by using machine learning. A machine learning classification method may be used with supervise learning. A set of training data (actual parking data) that has an identified category (level of vacancy) is used with the economic codes for entities within a predefined distance to determine the category of a new parking area.

The mapping system 121 may use other types of analysis or modeling such as statistical analysis, decision trees, or data mining techniques. Statistical analysis or decision trees identify statistical similarity quickly by employing linear mathematical models or simple conditional logic. Data mining techniques are fast at identifying the probabilistic occurrence of a sequence of events with another. Alternative modeling systems may be used, such as regression analysis or deep learning though neural networks. Regression analysis is a statistical process for estimating the relationships among variables. Regression analysis may be used to identify the strength of the relationship between two variables such as how the parking is related to economic activity. Regression analysis takes a group of random variables, thought to be predicting an outcome, and tries to find a mathematical relationship between them. Neural networks may be used to generate the model.

Data (actual parking occupancies and economic classifications) for training the model may be collected from different regions and combined to generate a universal model for predicting parking vacancies. Alternatively, different models may be generated for different regions. The model may be updated or adjusted as new parking data is collected. The economic classification data may be first reduced in size using dimensionality reductions, for example, by using principle components analysis (PCA). PCA is a procedure for identifying a smaller number of uncorrelated variables, called principal components, from a large set of data.

The predicted occupancy may be a percentage based prediction. For example, the predicted occupancy may be calculated as a percentage between 1 and 100 that an occupancy (or multiple occupancies) exists in a parking area for a certain time period. The predicted occupancy may be binary, e.g. either there is a likelihood of an open parking spot or not. The predicted occupancy may predict if a parking area is 50 percent open for example. A parking area that is over 50 percent open may be likely to have an open spot, while a parking spot that is under 50 percent open may be unlikely (although still possible) to have an open spot. Different percentages or types of predictions may be used depending on the size of the parking area, the region of the parking area, the amount and type of the collected data, and other factors.

At act A150, the mapping system 121 provides the predicted occupancy for the parking area. The mapping system 121 may transmit or display the predicted occupancy for one or more time periods. For a route request, the mapping system 121 may provide a plurality of destination options for a request. For example, if the route request was for a destination A, the mapping system 121 may return multiple options including a route directly to the destination, a route to a parking area in the vicinity that was predicted to have an open spot, and a route to a parking area in the vicinity that had the highest predicted availability for an open spot. The mapping system 121 may broadcast the predicted occupancy data. The mapping system 121 may render a display of the predicted occupancy. The display of the predicted occupancy may include visual or textual indicators of the predicted occupancy. A device may display the predicted occupancy. Restrictions on parking may be derived from the predicted occupancy data. The potential restrictions may be displayed by the mapping system 121.

Figure 10:
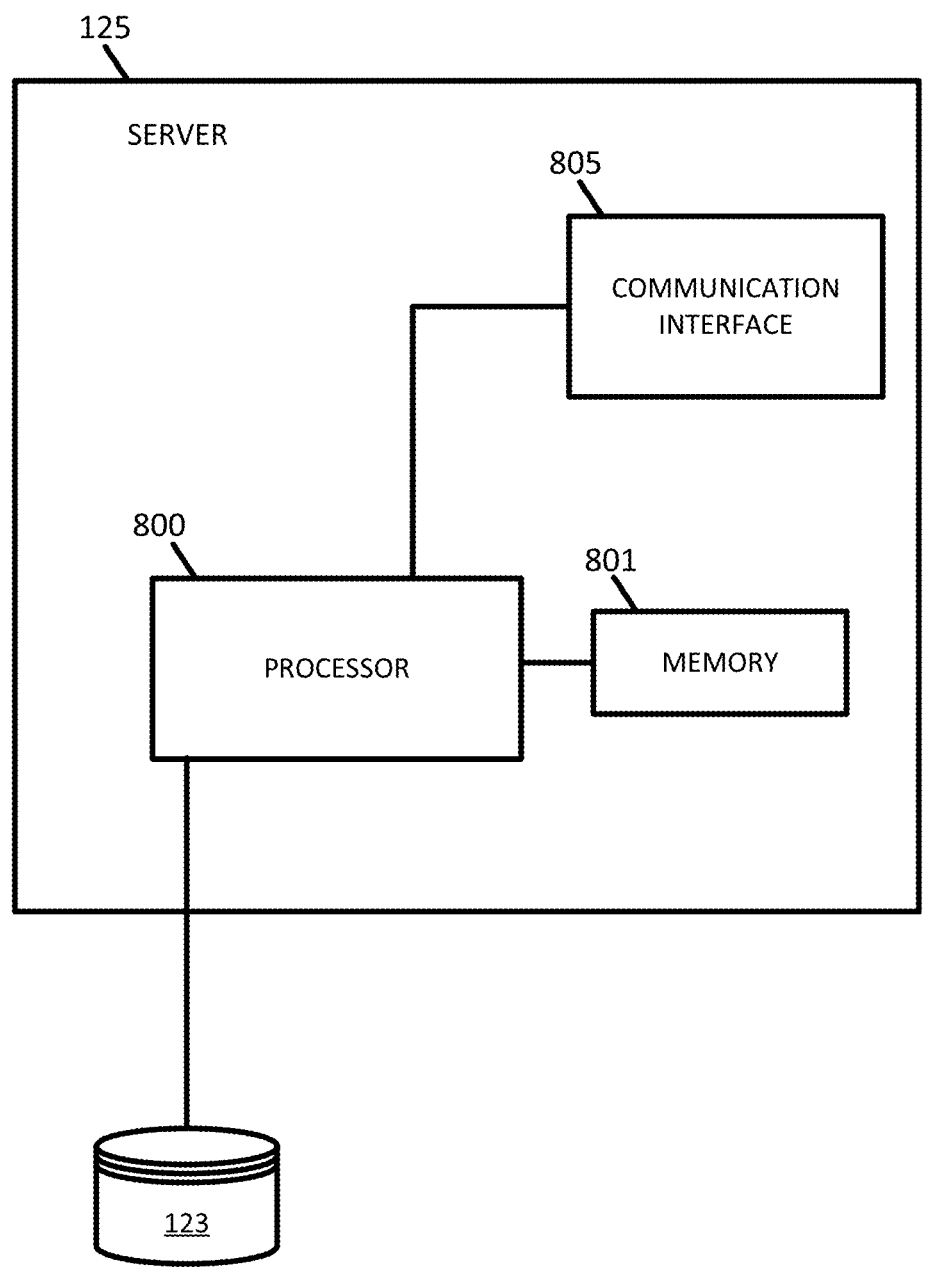
FIG. 10 illustrates an example server of FIG. 2.

FIG. 10 illustrates an example server 125 of the system of FIG. 2. The server 125 includes a processor 800 that is connected to a communications interface 805 and a memory 801. The processor 800 is also connected to the geographic database 123. The communications interface 805 is configured to receive parking data or economic activity data. The memory 801 is configured to store received economic activity and historical parking data. The processor 800 is configured to predict the availability of parking for a parking area based on one or more economic entities within a predefined distance of the parking area. The processor 800 may be configured to generate maps and routing instructions. Additional, different, or fewer components may be included.

Figure 11:
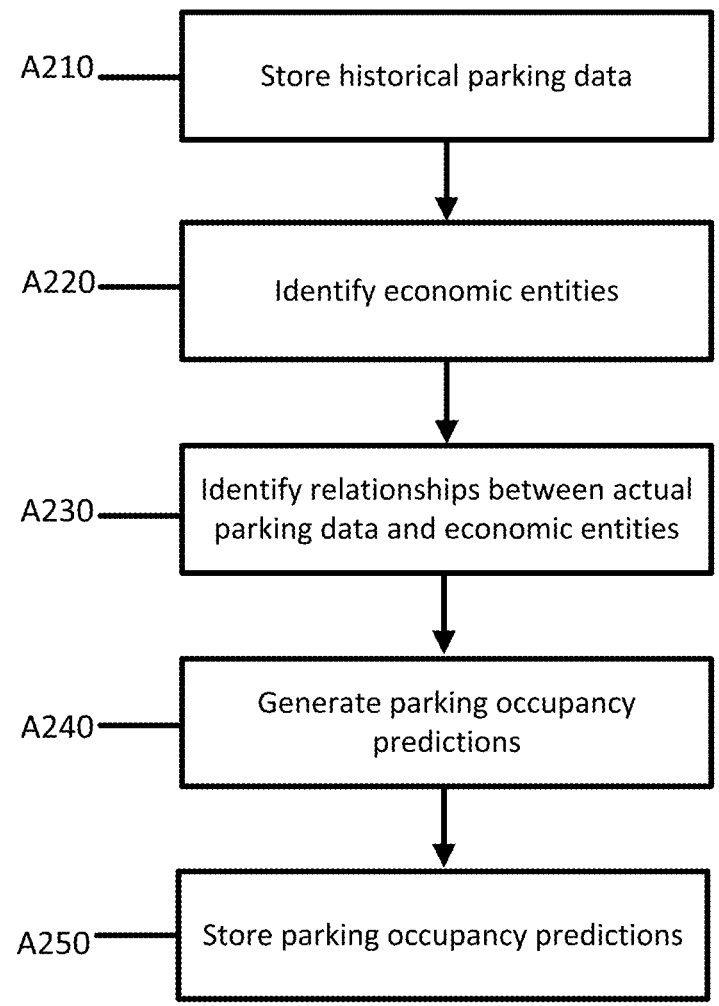
FIG. 11 illustrates an example workflow for predicting parking occupancies.

FIG. 11 illustrates an example flow chart for predicting occupancy of a parking area using the server 125 of FIG. 10. As presented in the following sections, the acts may be performed using any combination of the components indicated in FIG. 2, FIG. 10, or FIG. 12. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A210, a processor 800 stores in a memory 801, historical data relating to an occupancy level for a plurality of parking areas. The historical data may be collected from devices, personal, or other sources and stored in a memory. The historical data may include an indication of where and when occupancies exist. For example, the historical data for a sample parking area may include data indicate of 3 vacancies for a first hour, 2 vacancies for a second hour, no vacancies for a third through eight hours, and 5 vacancies for a ninth and tenth hour. Data for a parking area may be collected over a period of time. The data may be averaged to determine an average number of vacancies for each time period. In an embodiment, the data collected may be binary in that the data reflects if or if not a parking vacancy is available or a certain percentage of spots are available or not. For the above sample data set, the data would indicate a parking vacancy in the first, second, ninth and tenth hours. In an embodiment, the data collected may indicate a percentage of open spaces in a parking area. For example, the collected data may indicate for certain time periods when 50 percent or more of the parking spots are vacant. The data may be averaged with other collected data from similar time periods to generate an occupancy prediction.

At act A220, the processor 800 identifies a plurality of economic entities within a predefined distance of each of the plurality of parking areas. Each economic entity of the plurality of economic entities may be described by an economic activity code. The economic entities and economic activity codes may be stored in the memory 801. The economic entities may correspond to a geographic location. The economic activity codes may be retrieved from an economic classification system such as the International Standard Industrial Classification (ISIC), the North America North American Industry Classification System (NAICS), the United States Standard Industrial Classification (SIC), the Europe Statistical classification of economic activities in the European Community (NACE), or the United Kingdom Standard Industrial Classification of Economic Activities. Each of these systems may be used to classify business entities by economic activity. The codes identify what or how the business operates at a location. The classification systems may cover multiple activities of a location. For example, the principal activity of an economic entity is the activity that contributes most to the value added of the entity. A secondary activity is each separate activity that produces products or services that is not the principal activity of the entity in question. Most economic entities produce at least some secondary products and may have multiple codes applied to a location.

The predefined distance may be determined based on the entities that the parking areas serve. For example, a parking area may be expected to serve entities at locations that are no more than 150 meters away from the parking area. The distance value (e.g. 150 meters) may vary from region to region or type of area to type of area.

At act A230, the processor 800 identifies one or more relationships between the historical data and the economic activity codes for each of the plurality of parking areas. The processor 800 may use machine learning to classify the parking areas. In machine learning, classification is the problem of identifying to which of a set of categories an observation belongs. There may be two classifications for a parking prediction. There are parking areas with no parking spots available and parking locations with parking spots available. The classifications are identified based on a training set of data identified and stored at act A210, the data containing observations whose category membership is identified.

Classification may use supervised learning. Supervised learning is the machine learning task of inferring a function from a labeled training data. In this type of learning individual observations are analyzed into quantifiable properties referred to as explanatory variables or features. The features are categorical. The explanatory variables are the industry classifications of economic activity of businesses. The set of classifications is large and as such, the resulting number of features is high. The economic codes cover all types of economic activity. This large dimensionality may be seen in the codes of the International Standard Industrial Classification of All Economic Activities (ISIC), Rev.4 from The Department of Economic and Social Affairs of the United Nations Secretariat. ISIC includes 21 sections, which are then further subdivided into a total of 88 divisions, 238 groups and 419 classes.

The economic activity codes may be reduced in dimensionality before the supervised steps of the classification model may be performed. One way of reducing the large number of features is dimensionality reduction. Dimensionality reduction may be achieved through another machine learning model. Dimensionality reduction may use unsupervised learning. Unsupervised learning is the machine learning task of inferring a function to describe hidden structure from unlabeled data. Principal component analysis (PCA) is one method of dimensionality reduction. PCA is an unsupervised learning technique that looks for a smaller combination of features that capture the variance of the original features. Applying PCA to the large number of economic classification codes may limit the dimensionality to a manageable level while retaining the variance of the original large dimensions.

In an embodiment, the training process entails collecting actual parking data, reducing the data to a manageable size, and generating the model from the reduced data set. The actual parking data is collected for parking areas. The parking areas may be on street parking spaces. Each road segment may have one or more areas associated with it. For the collection of data, the average occupancy data is computed for 24 one hour time periods for each day of the week. For each road segment, the distance is computed to businesses that are in a radius of 150 meters from each parking area. All distances found for multiple lots for each road are ordered by distance. In this example, a number of shortest distances may be used for features in the classification model. Different numbers of distances may be used, for example top 10, top 20, top 100 etc. In addition, for each corresponding distance a number of economic activity codes may be used as categorical features. In certain embodiments, different numbers of categorical features may be used, for example, the top 10 or top 5. The categorical features may be turned into binary features for the predefined number of categorical economic codes, for example, 100, 500, 700, etc. The remainder of the codes may be dropped. Dimensionality reduction is performed on the features. For values that may not be applicable, a value of low predictive power may be used. An example is where a parking lot location did not have twenty businesses within 150 meters. The final set of features before principal component analysis (PCA) was done include: day-of-week, hour-of-day, and the distance and economic activity codes to the top 20 businesses where the economic codes were made into binary features. For PCA the top 100 features may be kept.

At act A240, the processor 800 generates an occupancy prediction for a requested parking area based on one or more economic entities within the predefined distance of the requested parking area, economic activity codes of the one or more economic entities, and the one or more relationships.

Different modeling systems may be used to model the economic activity codes and parking occupancies. The relationships between the economic codes and actual parking vacancy data may be determined by using machine learning. A machine learning classification method may be used with supervise learning. A set of training data (actual parking data) that has an identified category (level of vacancy) is used with the economic codes for entities within a predefined distance to determine the category of a new parking area.

At act A250, the processor 800 stores the occupancy prediction for the requested parking area in the memory. The occupancy predictions may be generated and stored for different time periods and different events. For example, an occupancy prediction may be stored for each hour of the day, for each day of the week, with different predictions for events and weather. The occupancy prediction may be transmitted to a navigation device. The occupancy prediction may be used when generating routes. The occupancy prediction may be used with other roadway data to generate a more accurate model of the roadway, for example improving traffic condition predictions. The occupancy predictions may be used for parking planning or business planning. For example, the parking planning may be used to identify if a new business would affect parking. The occupancy predictions may be used to determine restrictions on parking.

Figure 12:
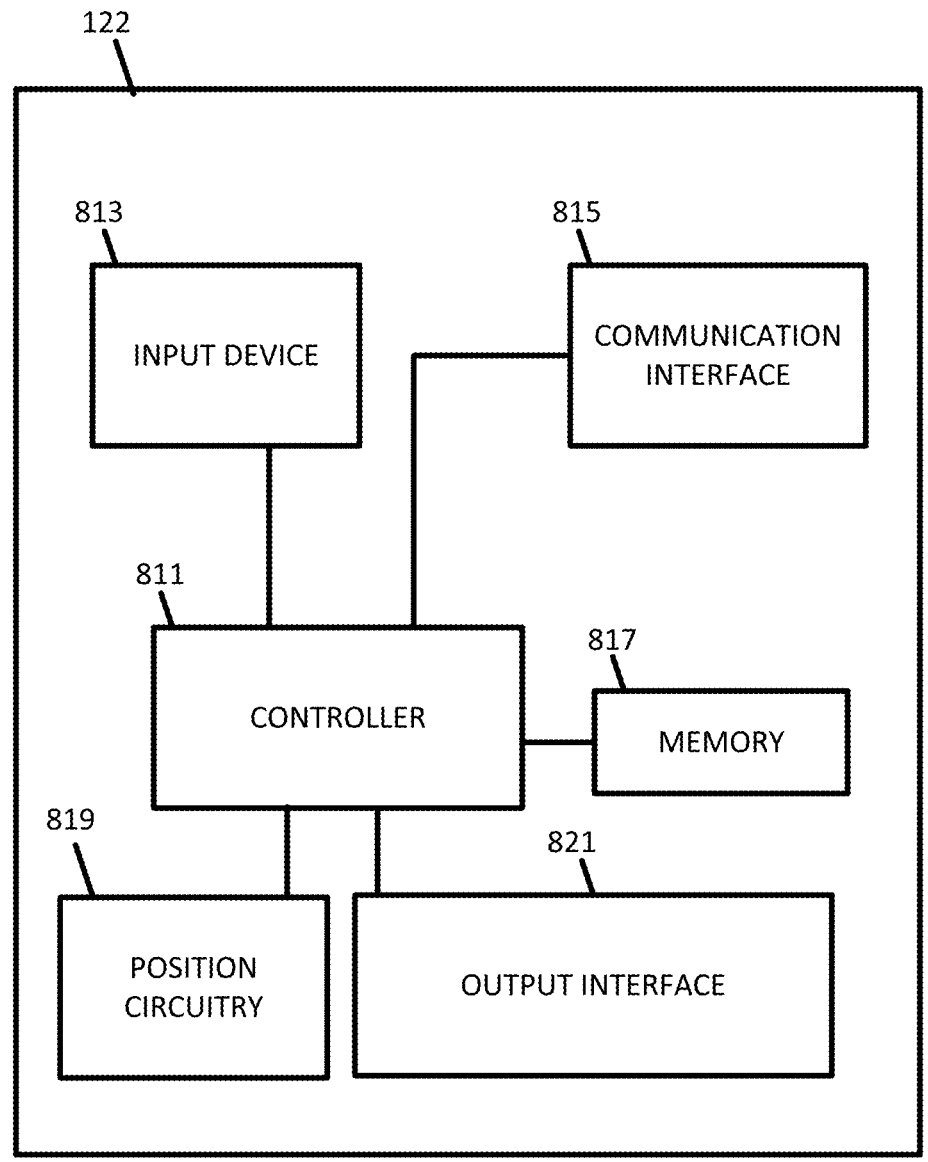
FIG. 12 illustrates an example navigation device of FIG. 2.

FIG. 12 illustrates an example device 122 of the system of FIG. 2. The device 122 may be configured to collect, transmit, receive, process, or display data. The device 122 may also be referred to as a probe 122, a mobile device 122 or a navigation device 122. The navigation device 122 includes a controller 811, a memory 817, an input device 813, a communication interface 815, position circuitry 819, and an output interface 821. The output interface 821 may present visual or non-visual information such as audio information. Additional, different, or fewer components are possible for the mobile device 122. The navigation device 122 may be smart phone, a mobile phone, a personal digital assistant (PDA), a tablet computer, a notebook computer, a personal navigation device (PND), a portable navigation device, and/or any other known or later developed mobile device. In an embodiment, a vehicle may be considered a device 122, or the device 122 may be integrated into a vehicle. The device 122 may receive or collect data from one or more sensors in or on the vehicle.

Figure 13:
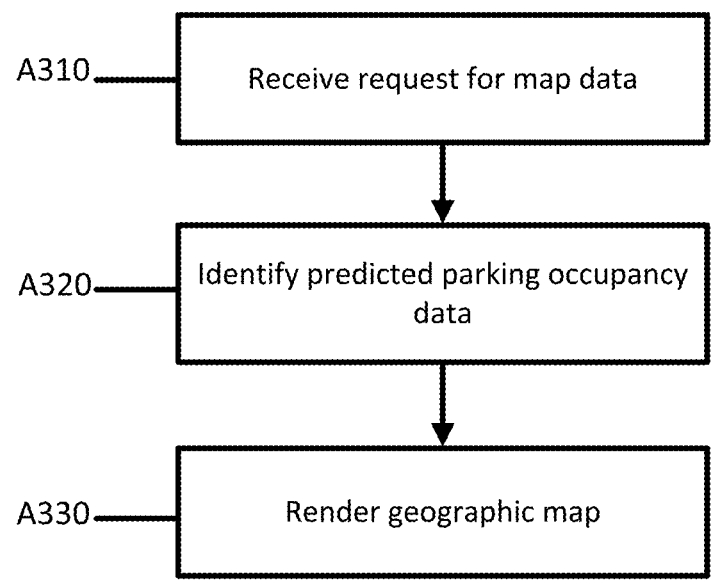
FIG. 13 illustrates an example workflow for predicting parking occupancies using the example navigation device of FIG. 12.

FIG. 13 illustrates an example flow chart for predicting occupancy of a parking area. As presented in the following sections, the acts may be performed using any combination of the components indicated in FIG. 2, FIG. 10, or FIG. 12. The following acts may be performed by the server 125, the device 122, the mapping system 121, or a combination thereof. Additional, different, or fewer acts may be provided. The acts are performed in the order shown or other orders. The acts may also be repeated. Certain acts may be skipped.

At act A310, the device 122 receives a request for map data relating to a destination. The device 122 may be configured to receive a request from a user or vehicle to provide map data. The device 122 may provide map data automatically when activated or in response to detecting a location of the device 122. The device 122 may provide map data automatically in response to receiving updated map data or in response to updated roadway conditions.

The device 122 may be configured to receive a request for predicted parking occupancy for a parking area. A user may specify a location such as a parking area for which map data or predicted parking occupancy is requested. In one example, the device 122 may be configured to identify a starting location and a destination. The starting location and destination may be input though the input device 813. For example, a user may request a route to a destination using the input device 813. The input device 813 may be one or more buttons, keypad, keyboard, mouse, stylus pen, trackball, rocker switch, touch pad, voice recognition circuit, or other device or component for inputting data to the mobile device 122. The input device 813 and the output interface 821 may be combined as a touch screen that may be capacitive or resistive.

The starting location (such as a current location) may be identified using positional circuitry such as GPS or other positional inputs. The positioning circuitry 819, which is an example of a positioning system, is configured to determine a geographic position of the device 122. The positioning circuitry 819 may include movement circuitry, which is an example a movement tracking system, is configured to determine movement of a device 122. The position circuitry 819 and the movement circuitry may be separate systems, or segments of the same positioning or movement circuitry system. In an embodiment, components as described herein with respect to the navigation device 122 may be implemented as a static device. For example, such a device may not include movement circuitry 819, but may involve a speed or velocity detecting input device 813.

The device 122 may identify its position as the device travels along a route using the positional circuitry. For indoor spaces without GPS signals, the navigation device 122 may rely on other geolocations methods such as LIDAR, radar, Wi-Fi, beacons, landmark identification, inertial navigation (dead reckoning), among others.

The device 122 may be configured to execute routing algorithms using a geographic database 123 to determine an optimum route to travel along a road network from a starting location to a destination location in a geographic region. Using input from an end user, the device 122 examines potential routes between the origin location and the destination location to determine the optimum route in light of user preferences or parameters. The device 122 may then provide the end user with information about the optimum route in the form of guidance that identifies the maneuvers required to be taken by the end user to travel from the origin to the destination location. Some devices 122 show detailed maps on displays outlining the route, the types of maneuvers to be taken at various locations along the route, locations of certain types of features, and so on.

The device 122 may be configured to generate or request a route from the starting location to the destination. The device 122 may further request the route be based on user preferences including parking options. The communication interface 815 may include any operable connection. An operable connection may be one in which signals, physical communications, and/or logical communications may be sent and/or received. An operable connection may include a physical interface, an electrical interface, and/or a data interface. The communication interface 815 provides for wireless and/or wired communications in any now known or later developed format. The communication interface 815 may include a receiver/transmitter for digital radio signals or other broadcast mediums. A receiver/transmitter may be externally located from the device 122 such as in or on a vehicle.

At act A320, the device 122 identifies predicted parking occupancy data for one or more parking areas within a set distance of the destination. The predicted parking occupancy data may be calculated by a parking occupancy model generated from activity classifications of one or more entities within a predefined distance of each of the one or more parking areas. The parking predictions for each area may be generated at a mapping system 121 and may be based on a model trained with actual parking observations and economic activity codes. The model may use machine learning techniques to identify patterns between collected historical parking data and economic codes for economic entities located within a predefined distance of the parking area. The model may use classification to identify the patterns. Classification is the problem of identifying to which of a set of categories a new observation belongs, on the basis of a training set of data containing observations (or instances) whose category membership has been identified. The set of categories may be whether a parking area has vacancies or not given the economic entities within a predetermined distance of the parking area. The training set of data is actual parking data from parking areas collected over time for which economic entities have been identified. The economic entities may be classified based on economic activity codes in order to reduce the set of features for the classification process.

At act A330, the device renders a geographic map including a representation of a predicted parking occupancy for at least one parking area of the one or more parking areas based on the identified predicted parking occupancy data. The device 122 or mapping system 121 may display the geographic map including the parking predictions. The geographic map may include different shades or colors or visual effects to indicate different predicted occupancy levels. The device 122 or mapping system may further render a geographic map including a route from a starting to a destination, for example including at least one parking area. The route may be displayed using the output interface 821. The route may be displayed for example as a top down view or as an isometric projection. Road segments may be colored or shaded differently depending on the road segment's predicted available parking. For example, a side street with a high probability of a vacant spot may be colored or shaded differently than a side street with a lower probability. The parking vacancy predictions may not guarantee a parking spot is open, only that based on the estimated economic activity (and possibly other factors) in similar circumstances (time of day, weather, etc.) there may be a vacancy. A prediction system using a percentage value system may generate the percentages based on the number of available spots and the historical data. For example, for two parking areas that server similar economic entities, if one of the parking areas has more spots, the probability that that parking area has a vacant spot may be greater than the smaller parking area. The parking vacancy probabilities may be stored locally on the device. The parking vacancy probabilities may be updated as the model is trained and tuned with additional actual parking data. The updated parking vacancy data may be downloaded automatically to the device or retrieved on demand.

The geographic map and/or route may be generated with additional information from a geographic database 123. Routes to specific types of parking areas for larger vehicles that require larger parking spots, may be generated specifically for those modes of transportation. Routes for vehicles that require temporary parking may be generated differently. Different parking areas may be selected based on user preferences or the type of parking that may be available to a vehicle. For example, parking that may be restricted by residence or size of vehicle or length of time. A user may select a predefined threshold for parking occupancy. In an example, a user may select a destination and a parking setting that requests a parking area within 150 meters of the destination that is expected to be less than 50% occupied. A route may be generated for the user from the current location of the user to a parking area that is predicted to be less than 50% occupied. If more than one parking area that fits the criteria (e.g. covered, large enough spots for the vehicle in question, the cost of parking, parking restrictions, etc.), each of the potential areas may be displayed with the predicted occupancy. In an embodiment, the parking area destination may be selected automatically based on the preferences.

The geographic map may include parking availability in the form of attributes for road segments, links, or nodes. For example, parking areas (lots, street parking, structures) may be highlighted along the route that are predicted to have at least one vacancy or a preferred level of vacancy. The parking areas may be, for example, colored differently based on the confidence level of the prediction. For example, a parking area that has an 80% chance of an unoccupied spot may be displayed differently than a parking area with a 50% chance of an unoccupied spot. The route may include alternative destinations for a vehicle. For example, in accordance with user preferences, a route may be generated and received that identifies a parking area in the vicinity of the destination that has a high probability of an unoccupied spot. By generating the route to the parking area, a vehicle may be spared the time of cruising around the area looking for an open spot. Certain parking areas, that for example, have parking restrictions (time/residence/event/etc.) may be automatically excluded from the possible destinations. Weather may also be used in selecting a parking area. A parking area that is uncovered may be less desirable even though there is a higher probability of an open spot.

The geographic map may be provided to a user by the output interface 821. The output interface 821 may be a liquid crystal display (LCD) panel, light emitting diode (LED) screen, thin film transistor screen, or another type of display. The output interface 821 may also include audio capabilities, or speakers.

The memory 817 may be a volatile memory or a non-volatile memory. The memory 817 may include one or more of a read only memory (ROM), random access memory (RAM), a flash memory, an electronic erasable program read only memory (EEPROM), or other type of memory. The memory 817 may be removable from the mobile device 122, such as a secure digital (SD) memory card. The memory may contain a locally stored geographic database or link node routing graph. The locally stored geographic database may be a copy of the geographic database 123 or may include a smaller piece. The locally stored geographic database may use the same formatting and scheme as the geographic database. The navigation device 122 may determine a route or path from a received or locally geographic database using the controller 811. The controller 811 may include a general processor, digital signal processor, an application specific integrated circuit (ASIC), field programmable gate array (FPGA), analog circuit, digital circuit, combinations thereof, or other now known or later developed processor. The controller 811 may be a single device or combinations of devices, such as associated with a network, distributed processing, or cloud computing.

The parking vacancy data may be used to directly or indirectly navigate a vehicle. The device 122 may be integrated into an autonomous vehicle or a highly-assisted driving (HAD) vehicle. The device 122 may be configured as a navigation system for an autonomous vehicle or a HAD. An autonomous vehicle or HAD may take route instruction based on the link and node information provided to the navigation device 122. The parking vacancy data may be used to self-park an autonomous vehicle by identifying potential parking areas and directing the autonomous vehicle to those areas.

The term "computer-readable medium" includes a single medium or multiple media, such as a centralized or distributed database, and/or associated caches and servers that store one or more sets of instructions. The term "computer-readable medium" shall also include any medium that is capable of storing, encoding, or carrying a set of instructions for execution by a processor or that cause a computer system to perform any one or more of the methods or operations disclosed herein.

In a particular non-limiting, exemplary embodiment, the computer-readable medium can include a solid-state memory such as a memory card or other package that houses one or more non-volatile read-only memories. Further, the computer-readable medium can be a random-access memory or other volatile re-writable memory. Additionally, the computer-readable medium can include a magneto-optical or optical medium, such as a disk or tapes or other storage device to capture carrier wave signals such as a signal communicated over a transmission medium. A digital file attachment to an e-mail or other self-contained information archive or set of archives may be considered a distribution medium that is a tangible storage medium. Accordingly, the disclosure is considered to include any one or more of a computer-readable medium or a distribution medium and other equivalents and successor media, in which data or instructions may be stored.

In an alternative embodiment, dedicated hardware implementations, such as application specific integrated circuits, programmable logic arrays and other hardware devices, can be constructed to implement one or more of the methods described herein. Applications that may include the apparatus and systems of various embodiments can broadly include a variety of electronic and computer systems. One or more embodiments described herein may implement functions using two or more specific interconnected hardware modules or devices with related control and data signals that can be communicated between and through the modules, or as portions of an application-specific integrated circuit. Accordingly, the present system encompasses software, firmware, and hardware implementations.

In accordance with various embodiments of the present disclosure, the methods described herein may be implemented by software programs executable by a computer system. Further, in an exemplary, non-limited embodiment, implementations can include distributed processing, component/object distributed processing, and parallel processing. Alternatively, virtual computer system processing can be constructed to implement one or more of the methods or functionality as described herein.

Although the present specification describes components and functions that may be implemented in particular embodiments with reference to particular standards and protocols, the invention is not limited to such standards and protocols. For example, standards for Internet and other packet switched network transmission (e.g., TCP/IP, UDP/IP, HTML, HTTP, HTTPS) represent examples of the state of the art. Such standards are periodically superseded by faster or more efficient equivalents having essentially the same functions. Accordingly, replacement standards and protocols having the same or similar functions as those disclosed herein are considered equivalents thereof.

A computer program (also known as a program, software, software application, script, or code) can be written in any form of programming language, including compiled or interpreted languages, and it can be deployed in any form, including as a standalone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in the specification can be performed by one or more programmable processors executing one or more computer programs to perform functions by operating on input data and generating output. The processes and logic flows can also be performed by, and apparatus can also be implemented as, special purpose logic circuitry, e.g., an FPGA (field programmable gate array) or an ASIC (application specific integrated circuit).

As used in the application, the term 'circuitry' or 'circuit' refers to all of the following: (a) hardware-only circuit implementations (such as implementations in only analog and/or digital circuitry) and (b) to combinations of circuits and software (and/or firmware), such as (as applicable): (i) to a combination of processor(s) or (ii) to portions of processor(s)/software (including digital signal processor(s)), software, and memory(ies) that work together to cause an apparatus, such as a mobile phone or server, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this application, including in any claims. As a further example, as used in this application, the term "circuitry" would also cover an implementation of merely a processor (or multiple processors) or portion of a processor and its (or their) accompanying software and/or firmware. The term "circuitry" would also cover, for example and if applicable to the particular claim element, a baseband integrated circuit or applications processor integrated circuit for a mobile phone or a similar integrated circuit in server, a cellular network device, or other network device.

Processors suitable for the execution of a computer program include, by way of example, both general and special purpose microprocessors, and anyone or more processors of any kind of digital computer. Generally, a processor receives instructions and data from a read only memory or a random-access memory or both. The essential elements of a computer are a processor for performing instructions and one or more memory devices for storing instructions and data. Generally, a computer also includes, or be operatively coupled to receive data from or transfer data to, or both, one or more mass storage devices for storing data, e.g., magnetic, magneto optical disks, or optical disks. However, a computer need not have such devices. Moreover, a computer can be embedded in another device, e.g., a mobile telephone, a personal digital assistant (PDA), a mobile audio player, a GPS receiver, to name just a few. Computer readable media suitable for storing computer program instructions and data include all forms of non-volatile memory, media, and memory devices, including by way of example semiconductor memory devices, e.g., EPROM, EEPROM, and flash memory devices; magnetic disks, e.g., internal hard disks or removable disks; magneto optical disks; and CD ROM and DVD-ROM disks. The memory may be a non-transitory medium such as a ROM, RAM, flash memory, etc. The processor and the memory can be supplemented by, or incorporated in, special purpose logic circuitry.

To provide for interaction with a user, embodiments of the subject matter described in this specification can be implemented on a device having a display, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input.

Embodiments of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), e.g., the Internet.

The computing system can include clients and servers. A client and server are generally remote from each other and typically interact through a communication network. The relationship of client and server arises by virtue of computer programs running on the respective computers and having a client-server relationship to each other.

The illustrations of the embodiments described herein are intended to provide a general understanding of the structure of the various embodiments. The illustrations are not intended to serve as a complete description of all of the elements and features of apparatus and systems that utilize the structures or methods described herein. Many other embodiments may be apparent to those of skill in the art upon reviewing the disclosure. Other embodiments may be utilized and derived from the disclosure, such that structural and logical substitutions and changes may be made without departing from the scope of the disclosure. Additionally, the illustrations are merely representational and may not be drawn to scale. Certain proportions within the illustrations may be exaggerated, while other proportions may be minimized. Accordingly, the disclosure and the figures are to be regarded as illustrative rather than restrictive.

While this specification contains many specifics, these should not be construed as limitations on the scope of the invention or of what may be claimed, but rather as descriptions of features specific to particular embodiments of the invention. Certain features that are described in this specification in the context of separate embodiments can also be implemented in combination in a single embodiment. Conversely, various features that are described in the context of a single embodiment can also be implemented in multiple embodiments separately or in any suitable sub-combination. Moreover, although features may be described above as acting in certain combinations and even initially claimed as such, one or more features from a claimed combination can in some cases be excised from the combination, and the claimed combination may be directed to a sub-combination or variation of a sub-combination.

Similarly, while operations are depicted in the drawings and described herein in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

One or more embodiments of the disclosure may be referred to herein, individually and/or collectively, by the term "invention" merely for convenience and without intending to voluntarily limit the scope of this application to any particular invention or inventive concept. Moreover, although specific embodiments have been illustrated and described herein, it should be appreciated that any subsequent arrangement designed to achieve the same or similar purpose may be substituted for the specific embodiments shown. This disclosure is intended to cover any and all subsequent adaptations or variations of various embodiments. Combinations of the above embodiments, and other embodiments not specifically described herein, are apparent to those of skill in the art upon reviewing the description.

The Abstract of the Disclosure is provided to comply with 37 C.F.R. § 1.72(b) and is submitted with the understanding that it will not be used to interpret or limit the scope or meaning of the claims. In addition, in the foregoing Detailed Description, various features may be grouped together or described in a single embodiment for the purpose of streamlining the disclosure. This disclosure is not to be interpreted as reflecting an intention that the claimed embodiments require more features than are expressly recited in each claim. Rather, as the following claims reflect, inventive subject matter may be directed to less than all of the features of any of the disclosed embodiments. Thus, the following claims are incorporated into the Detailed Description, with each claim standing on its own as defining separately claimed subject matter.

It is intended that the foregoing detailed description be regarded as illustrative rather than limiting and that it is understood that the following claims including all equivalents are intended to define the scope of the invention. The claims should not be read as limited to the described order or elements unless stated to that effect. Therefore, all embodiments that come within the scope and spirit of the following claims and equivalents thereto are claimed as the invention.

The following embodiments are disclosed.

Embodiment 1

A method for predicting occupancy of a parking area. The method comprises receiving, by a processor, a request for data relating to occupancy of the parking area; identifying, by the processor, one or more first entities within a first predefined distance of the first parking area; receiving, by the processor, at least one activity classification code for each of the one or more first entities; calculating, by the processor, a first predicted occupancy for the parking area as a function of the at least one activity classification codes; and transmitting, by the processor, the first predicted occupancy for the parking area.

Embodiment 2 the method of claim 1, wherein at least one of the activity classification codes describe a first economic activity and a second economic activity for at least one of the first entities.

Embodiment 3 the method of claim 1, wherein the activity classification codes describe a type of economic activity by the first entities.

Embodiment 4 the method of claim 1, wherein the activity classification codes describe a level of revenue for the one or more first entities.

Embodiment 5 the method of claim 1, wherein calculating the first predicted occupancy comprises: comparing, by the processor, the activity classification codes to a plurality of patterns identified between a plurality of activity classification codes and historical occupancy data for a plurality of parking areas; and calculating, by the processor, the predicted occupancy of the parking area based on the comparison.

Embodiment 6 the method of claim 1, wherein the predicted occupancy represents whether the parking area is over or under 50% full.

Embodiment 7 the method of claim 1, wherein the parking area is a first parking area, the method further comprising: identifying, by the processor, a second parking area in the vicinity of the first parking area; identifying, by the processor, one or more second entities within a second predefined distance of the second parking area; receiving, by the processor, at least one activity classification code for each of the one or more second entities; generating, by the processor, a second predicted occupancy for the second parking area as a function of the activity classifications for the one or more second entities; and transmitting, by the processor, a location of the second parking area when the second predicted occupancy is lower than the first predicted occupancy.

Embodiment 8 the method of claim 1, wherein the first predicted occupancy is a prediction of whether there is at least one open parking spot in the parking area.

Embodiment 9 the method of claim 1, wherein the predefined distance is based on a walking distance from the parking area.

Embodiment 10 an apparatus for generating a model for predicting occupancy for parking, the apparatus comprising: at least one processor; and at least one memory including computer program code for one or more programs; the at least one memory configured to store the computer program code configured to, with the at least one processor, cause the apparatus to at least perform: store historical data relating to an occupancy level for a plurality of parking areas; identify a plurality of economic entities within a predefined distance of each of the plurality of parking areas; wherein each economic entity of the plurality of economic entities includes an economic activity code stored in the memory; identify one or more relationships between the historical data and the economic activity codes for each of the plurality of parking areas; wherein an occupancy prediction for a requested parking area is based on one or more economic entities within the predefined distance of the requested parking area, economic activity codes of the one or more economic entities, and the one or more relationships.

Embodiment 11 the apparatus of claim 10, wherein the at least one memory and computer program code are configured to cause the apparatus to further perform: transmit the occupancy prediction for the requested parking area to a navigation device.

Embodiment 12 the apparatus of claim 10, wherein the economic classifications include a first economic activity and a second economic activity for at least one of the economic entities.

Embodiment 13 the apparatus of claim 10, wherein the economic classifications describe a type of economic activity by the economic entities.

Embodiment 14 the apparatus of claim 10, wherein the at least one memory and computer program code are configured to cause the apparatus to further perform: reduce a number of economic activity codes for each of the plurality of parking areas using principle component analysis; wherein the one or more relationships are based on the historical data and the reduced economic activity codes.

Embodiment 15 the apparatus of claim 10, wherein the one or more relationships are stored in a parking prediction model.

Embodiment 16 the apparatus of claim 10, wherein the one or more relationships are identified through machine learning classification.

Embodiment 17 the apparatus of claim 10, wherein the historical data comprises an actual observation of whether a parking area is more than half full for a specified time period.

Embodiment 18 a non-transitory computer readable medium including instructions that when executed are operable to receive a request for map data relating to a destination; identify predicted parking occupancy data for one or more parking areas within a set distance of the destination; wherein the predicted parking occupancy data is calculated by a parking occupancy model generated from activity classifications of one or more entities within a predefined distance of each of the one or more parking areas; and render a geographic map including a representation of a predicted parking occupancy for at least one parking area of the one or more parking areas based on the identified predicted parking occupancy data.

Embodiment 19 the non-transitory computer readable medium of claim 18, wherein the geographic map is rendered using different visual effects for different levels of predicted occupancy for the at least one parking area.

Embodiment 20 the non-transitory computer readable medium of claim 18, wherein the instructions that when executed are further operable to: select a parking area from the at least one parking areas based on user preferences; and generate a route from a starting point to the selected parking area.

I claim:
1. A method for predicting occupancy of a parking area, the method comprising:
    receiving, by a processor, a request for data relating to occupancy of the parking area;
    identifying, by the processor, one or more first entities within a first predefined distance of the parking area;
    receiving, by the processor, at least one activity classification code for each of the one or more first entities, wherein the at least one activity classification code describes a type of economic activity by each of the one or more first entities;
    calculating, by the processor, a first predicted occupancy for the parking area as a function of the activity classification codes without sensor data or real time observation data; and
    transmitting, by the processor, the first predicted occupancy for the parking area.

2. The method of claim 1, wherein at least one of the activity classification codes describe a first economic activity and a second economic activity for at least one of the first entities.

3. The method of claim 1, wherein the activity classification codes further describe a level of revenue for the one or more first entities.

4. The method of claim 1, wherein calculating the first predicted occupancy comprises:
comparing, by the processor, the activity classification codes to a plurality of patterns identified between a plurality of activity classification codes and historical occupancy data for a plurality of parking areas; and
calculating, by the processor, the predicted occupancy of the parking area based on the comparison.

5. The method of claim 1, wherein the predicted occupancy represents whether the parking area is over or under 50% full.

6. The method of claim 1, wherein the parking area is a first parking area, the method further comprising:
identifying, by the processor, a second parking area in the vicinity of the first parking area;
identifying, by the processor, one or more second entities within a second predefined distance of the second parking area;
receiving, by the processor, at least one activity classification code for each of the one or more second entities;
generating, by the processor, a second predicted occupancy for the second parking area as a function of the activity classifications for the one or more second entities; and
transmitting, by the processor, a location of the second parking area when the second predicted occupancy is lower than the first predicted occupancy.

7. The method of claim 1, wherein the first predicted occupancy is a prediction of whether there is at least one open parking spot in the parking area.

8. The method of claim 1, wherein the predefined distance is based on a walking distance from the parking area.

9. An apparatus for generating a model for predicting occupancy for parking, the apparatus comprising:
at least one processor; and
at least one memory including computer program code for one or more programs; the at least one memory configured to store the computer program code configured to, with the at least one processor, cause the apparatus to at least perform:
store historical data relating to an occupancy level for a plurality of parking areas;
identify a plurality of economic entities within a predefined distance of each of the plurality of parking areas; wherein each economic entity of the plurality of economic entities includes an economic activity code stored in the memory; and
identify one or more relationships between the historical data and the economic activity codes for each of the plurality of parking areas; wherein an occupancy prediction for a requested parking area is based on one or more economic entities within the predefined distance of the requested parking area, economic activity codes of the one or more economic entities, and the one or more relationships.

10. The apparatus of claim 9, wherein the at least one memory and computer program code are configured to cause the apparatus to further perform:
transmit the occupancy prediction for the requested parking area to a navigation device.

11. The apparatus of claim 9, wherein the economic classifications include a first economic activity and a second economic activity for at least one of the economic entities.

12. The apparatus of claim 9, wherein the economic classifications describe a type of economic activity by the economic entities.

13. The apparatus of claim 9, wherein the at least one memory and computer program code are configured to cause the apparatus to further perform:
reduce a number of economic activity codes for each of the plurality of parking areas using principle component analysis; wherein the one or more relationships are based on the historical data and the reduced economic activity codes.

14. The apparatus of claim 9, wherein the one or more relationships are stored in a parking prediction model.

15. The apparatus of claim 9, wherein the one or more relationships are identified through machine learning classification.

16. The apparatus of claim 9, wherein the historical data comprises an actual observation of whether a parking area is more than half full for a specified time period.

17. A non-transitory computer readable medium including instructions that when executed are operable to:
receive a request for map data relating to a destination;
identify predicted parking occupancy data for one or more parking areas within a distance of the destination; wherein the predicted parking occupancy data is calculated by a parking occupancy model generated from economic activity classifications of one or more entities within a predefined distance of each of the one or more parking areas without real time sensor data or real time observations; and
render a geographic map including a representation of a predicted parking occupancy for at least one parking area of the one or more parking areas based on the identified predicted parking occupancy data.

18. The non-transitory computer readable medium of claim 17, wherein the geographic map is rendered using different visual effects for different levels of predicted occupancy for the at least one parking area.

19. The non-transitory computer readable medium of claim 17, wherein the instructions that when executed are further operable to:
select a parking area from the at least one parking areas based on user preferences; and
generate a route from a starting point to the selected parking area.

* * * * *